US009705150B2

(12) United States Patent
Ito et al.

(10) Patent No.: US 9,705,150 B2
(45) Date of Patent: Jul. 11, 2017

(54) METHOD FOR MANUFACTURING ELECTRODE SHEETS AND APPARATUS THEREFOR

(71) Applicants: Tsuyoshi Ito, Toyota (JP); Akiji Hayashi, Toyota (JP); Hiroki Ishida, Nagoya (JP); Ichiro Shibata, Shizuoka (JP); Keisuke Omori, Anjo (JP)

(72) Inventors: Tsuyoshi Ito, Toyota (JP); Akiji Hayashi, Toyota (JP); Hiroki Ishida, Nagoya (JP); Ichiro Shibata, Shizuoka (JP); Keisuke Omori, Anjo (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 227 days.

(21) Appl. No.: 14/307,613

(22) Filed: Jun. 18, 2014

(65) Prior Publication Data

US 2014/0325833 A1   Nov. 6, 2014

Related U.S. Application Data

(62) Division of application No. 12/922,713, filed as application No. PCT/JP2009/052719 on Feb. 17, 2009, now Pat. No. 8,828,102.

(30) Foreign Application Priority Data

Sep. 2, 2008   (JP) ................................. 2008-224456

(51) Int. Cl.
*H01M 10/04*   (2006.01)
*H01M 4/04*   (2006.01)
(Continued)

(52) U.S. Cl.
CPC ......... *H01M 10/0409* (2013.01); *H01M 4/04* (2013.01); *H01M 4/0435* (2013.01);
(Continued)

(58) Field of Classification Search
CPC .... H01M 4/04–4/0435; H01M 10/04–10/0587
See application file for complete search history.

(56) References Cited

U.S. PATENT DOCUMENTS 4,254,191 A    3/1981   Kniazzeh
4,256,813 A *  3/1981   Kniazzeh ................ H01M 2/12
                                                            29/623.3
(Continued)

FOREIGN PATENT DOCUMENTS

JP   05-028990    *  2/1993   .............. H01M 4/30
JP   9-45313          2/1997
(Continued)

OTHER PUBLICATIONS

Machine translation of JP 05-028990 (Feb. 1993).*
(Continued)

*Primary Examiner* — Jonathan Crepeau
*Assistant Examiner* — Jacob Buchanan
(74) *Attorney, Agent, or Firm* — Finnegan, Henderson, Farabow, Garrett & Dunner, LLP

(57) ABSTRACT

According to the method for manufacturing electrode sheets, in a first cutting step, an original sheet, including a belt-shaped metal foil and an electrode material coated thereon in a lengthwise direction to form a plurality of coated portions spaced at a predetermined gap, is cut at a location between the coated portions. In a pressing step, the original sheet strips having been cut in the first cutting step are pressed. In this case, the original sheet strips that are pressed by the rolling device are independent from each other. Therefore, the effect produced in rolling of the coated portions remains within each of the original sheet strips. In addition, distortions occurring in the original sheet strips can be prevented from affecting each other and the occurrence of wrinkles can be inhibited.

13 Claims, 18 Drawing Sheets

(51) Int. Cl.
    *H01M 4/139*       (2010.01)
    *H01M 10/0525*    (2010.01)
    *H01M 10/0587*    (2010.01)
    *H01M 10/34*       (2006.01)

(52) U.S. Cl.
    CPC ........ H01M 10/0431 (2013.01); *H01M 4/139* (2013.01); *H01M 10/0525* (2013.01); *H01M 10/0587* (2013.01); *H01M 10/345* (2013.01); *Y02E 60/12* (2013.01); *Y10T 29/49108* (2015.01); *Y10T 29/53139* (2015.01)

(56) References Cited

U.S. PATENT DOCUMENTS

| | | | |
|---|---|---|---|
| 4,609,597 | A | 9/1986 | Plasse |
| 4,614,026 | A * | 9/1986 | Plasse .................... H01M 2/12 29/623.3 |
| 5,697,145 | A | 12/1997 | Fukumura et al. |
| 6,547,229 | B1 * | 4/2003 | Hanson ................ B65H 29/243 156/230 |
| 2005/0066498 | A1 | 3/2005 | Ozaki |
| 2007/0059603 | A1 | 3/2007 | Sasaki et al. |

FOREIGN PATENT DOCUMENTS

| | | | | |
|---|---|---|---|---|
| JP | 9-63578 | | 3/1997 | |
| JP | 9-73920 | | 3/1997 | |
| JP | 09-219189 | * | 8/1997 | ............ H01M 4/04 |
| JP | 10-50302 | | 2/1998 | |
| JP | 11-343057 | * | 12/1999 | ............ B65H 27/00 |
| JP | 2000-12002 | | 1/2000 | |
| JP | 2002-231229 | | 8/2002 | |
| JP | 2002-234229 | | 8/2002 | |
| JP | 2003-68288 | | 3/2003 | |
| JP | 2003-068288 | * | 3/2003 | ............ H01M 4/04 |
| JP | 2003-157835 | | 5/2003 | |
| JP | 2005-190787 | | 7/2005 | |
| JP | 2007-311280 | | 11/2007 | |
| JP | 2008-66050 | | 3/2008 | |

OTHER PUBLICATIONS

Machine translation of JP 09-219189 (Aug. 1997).*
Machine translation of JP 11-343057 (Dec. 1999).*
Machine translation of JP 2003-068288 (Mar. 2003).*
International Search Report in International Application No. PCT/JP2009/052719, Mailing date: May 19, 2009.
Non-Final Office Action for U.S. Appl. No. 12/922,713 dated May 23, 2013.
Non-Final Office Action for U.S. Appl. No. 12/922,713 dated Jul. 3, 2013.
Final Office Action for U.S. Appl. No. 12/922,713 dated Jan. 8, 2014.
Notice of Allowance for U.S. Appl. No. 12/922,713 dated May 9, 2014.

* cited by examiner

METHOD FOR MANUFACTURING ELECTRODE SHEETS AND APPARATUS THEREFOR

CROSS-REFERENCE TO RELATED APPLICATIONS

This application is a division of application Ser. No. 12/922,713, which is a national phase application of International Application No. PCT/JP2009/052719, filed Feb. 17, 2009, and claims the priority of Japanese Application No. 2008-224456, filed Sep. 2, 2008, the contents of which are incorporated herein by reference.

TECHNICAL FIELD

The present invention relates to a method for manufacturing electrode sheets. The electrode sheets are suitable, for example, for a wound electrode body of a secondary battery (storage battery).

BACKGROUND ART

A method for manufacturing electrode sheets is disclosed, for example, in Patent document 1. As described in the patent application, a belt-shaped member in which an active material layer has been formed on a collector is cut, while being conveyed, in the conveying direction. A plurality of cutting blades are arranged in the traveling direction of the belt-shaped member, the central portion in the widthwise direction of the belt-shaped member is first cut and then battery electrodes positioned at both side portions of the belt-shaped member are finally cut. As a result, the appearance of burrs at the end surface of the electrode can be prevented.

Further, Patent document 2 discloses a technique for manufacturing electrode sheets in which an electrode material is coated in stripes on a belt-shaped collector perpendicularly to the lengthwise direction, so that uncoated sections remain in a predetermined gap between the stripes and the belt-shaped collector is slit in the widthwise direction.

Patent document 3 describes an invention relating to a mechanism that adjusts a tension of a pass line of a nickel-plated felt that arrives from a pressurizing device into a drying device via a coating device. More specifically, a configuration is disclosed in which a pre-tension imparting means and an after-tension imparting means that impart a constant tension are provided in a pass line before and after the coating device.

Further, Patent document 4 discloses an apparatus that corrects distortions in the thickness direction of an electrode sheet.

[Patent Document 1] Japanese Patent Application Laid-open No. 2003-68288.

[Patent Document 2] Japanese Patent Application Laid-open No. H9-45313.

[Patent Document 3] Japanese Patent Application Laid-open No. H9-63578.

[Patent Document 4] Japanese Patent Application Laid-open No. 2002-234229.

The inventors considered the possibility of obtaining a plurality of electrode sheets, as shown in FIG. 1, from an original sheet 1 that has a plurality of coated portions 11, 12, 13 coated with an electrode material in the lengthwise direction with a predetermined gap on a wide belt-shaped metal foil 10. In the original sheet 1, the electrode material 11, 12, 13 is coated on the metal foil 10 with a predetermined gap and dried. Then, the original sheet 1 is rolled with rollers and the density of the electrode material 11, 12, 13 is increased. The original sheet 1 is cut along cutting lines z1 to z5 that are set in the lengthwise direction on the coated portions 11, 12, 13 coated with the electrode material and in the portions between the coated portions 11, 12, 13 (uncoated portions 18, 19). As a result a plurality of electrode sheets can be manufactured with good efficiency.

DISCLOSURE OF THE INVENTION

As mentioned hereinabove, the original sheet 1 is rolled with rollers and the density of the electrode material 11, 12, 13 is increased. The inventors have found out that wrinkles occur in the metal foil 10 in this process. In order to manufacture electrode sheets of good quality, it is desirable that the occurrence of such wrinkles be inhibited. The present invention has been created with the object of inhibiting the occurrence of such wrinkles.

The method for manufacturing electrode sheets in accordance with the present invention has a first cutting step and a pressing step. In the first cutting step, an original sheet including a belt-shaped metal foil and an electrode material coated thereon in a lengthwise direction and having coated portion coated with the electrode material in a lengthwise direction to form a plurality of coated portions spaced at a predetermined gap, is cut at a predetermined location between the coated portions coated with the electrode material, to form original sheet strips. In the pressing step, the original sheet strips having been cut in the first cutting step are pressed.

With such a manufacturing method the original sheet is cut at a location between the coated portions having been coated with the electrode material before the pressing step. In the pressing step, the original sheet strips having been cut in such a manner are pressed. Therefore, the original sheet strips do not interfere with each other in the pressing step and the occurrence of wrinkles in the metal foil can be inhibited.

In the pressing step, the original sheet strips having been cut in the first cutting step and arranged side by side in a widthwise direction may be pressed by sandwiching the original sheet strips between a pair of rolls. In this case, because the pressing can be conducted with a pair of rolls, the conveying path is not complex, the equipment cost can be reduced, and space can be saved. Further, settings of rolling the original sheet strips to obtain uniform electrode sheets can be easily made and therefore the operability is good.

Further, a gap adjusting step of widening the gap between the plurality of original sheet strips having been cut in the first cutting step and supplying the original sheet strips to the pressing step may be provided between the first cutting step and the pressing step. The gap adjusting step makes it possible to prevent the end portions of the original sheet strips having been cut in the first cutting step from rubbing against each other.

Further, the speed adjusting step of adjusting the speed of the plurality of original sheet strips obtained in the first cutting step may be provided between the first cutting step and the pressing step, so that the speed of the original sheet strips that are supplied to the pressing step may be adjusted by the speed adjusting step. With the speed adjusting step, the difference in tension acting on the original sheet strips can be eliminated and the original sheet strips can be smoothly conveyed to the pressing step.

A second cutting step of cutting the original sheet strips, having been cut in the first cutting step, in the coated portions having been coated with the electrode material may be provided after the pressing step. As a result, it is possible to obtain an electrode sheet in which the coated portion is located at one widthwise end, from each of the original sheet strips.

In this case, a distortion correcting step of correcting distortions of the original sheet strips having been cut in the first cutting step may be provided after the pressing step and before the second cutting step. In the distortion correcting step, the uncoated portions are elongated more than the coated portions of the original sheet strips.

In the pressing step, the metal foil is elongated in the coated portions having been coated with the electrode material, but the elongation of the metal foil in the uncoated portions is less than that in the coated portions. As a result, distortions can appear in the original sheet strips. However, the distortion correcting step can correct these distortions.

An electrode sheet manufacturing apparatus in accordance with the present invention includes a conveying mechanism, a first cutting device, and a rolling device. The conveying mechanism conveys an original sheet. The first cutting device cuts the original sheet conveyed by the conveying mechanism. The rolling device is arranged downstream of the first cutting device in a conveying path of the conveying mechanism and presses the original sheet strips having been cut by the first cutting device. The conveying mechanism can convey the original sheet comprising a belt-shaped metal foil and an electrode material coated thereon so as to form a plurality of coated portions coated with the electrode material in a lengthwise direction and spaced at a predetermined gap. The first cutting device has a slitter arranged so as to be capable of cutting the original sheet at a location between coated portions coated with the electrode material.

With such a manufacturing apparatus, the original sheet is cut at a location between the coated portions coated with the electrode material by the first cutting device before the original sheet is supplied to the rolling device. Because the rolling device presses the cut original sheet strips, the original sheet strips do not interfere with each other and the occurrence of wrinkles in the metal foil can be inhibited.

In this case, a position adjusting mechanism configured to adjust a widthwise position of the original sheet fed to the first cutting device may be provided upstream of the first cutting device in the conveying path.

Further, the rolling device may have a pair of rolls, and the rolling device may press the original sheet strips having been cut by the first cutting device by arranging the original sheet strips side by side so as to be spaced at a gap in an axial direction of the rolls and sandwiching the original sheet strips between the pair of rolls. In this case, because the pressing is conducted with a pair of rolls, the conveying path is not complex and the equipment cost can be reduced. Further, the space can be saved. In addition, settings of rolling the original sheet strips to obtain uniform electrode sheets can be easily made and therefore the operability is good.

A gap adjusting device configured to widen a gap of the plurality of original sheet strips having been cut by the first cutting device may be provided in the conveying path between the first cutting device and the rolling device. As a result, end portions of the original sheet strips having been cut by the first cutting device can be prevented from rubbing against each other.

Further, a speed adjusting mechanism configured to adjust the speed of each of the plurality of original sheet strips having been cut by the first cutting device may be provided between the first cutting device and the rolling device in the conveying path, so that the speed of the original sheet strips fed to the rolling device is adjusted by the speed adjusting device. With such a speed adjusting mechanism, the difference in tension acting upon the original sheet strips can be eliminated and the original sheet strips can be smoothly conveyed to the rolling device.

A second cutting device configured to cut the original sheet strips having been cut by the first cutting device in coated portions coated with the electrode material may be provided downstream of the rolling device in the conveying path. As a result, electrode sheets in which the coated portions are on one side in the widthwise direction can be obtained from the original sheet strips.

A distortion correcting device may be provided between the rolling device and the second cutting device in the conveying path. For example, the distortion correcting device has a correction roller onto which the original sheet strips are caught, and a section of the correction roller that supports uncoated portions of the original sheet strips is thicker than a section that supports coated portions of the original sheet strips. In this case, the section of the correction roller that supports the uncoated portions on both widthwise ends of the original sheet strips may be replaceable.

In the rolling device, the metal foil elongates in the coated portions coated with the electrode material, but in the uncoated portions, the elongation of the metal foil is less than that in the coated portions. As a result, distortions can occur in the original sheet strips. However, these distortions can be corrected by the distortion correcting device.

Further, a position adjusting mechanism configured to adjust a widthwise position of the original sheet strips supplied to the second cutting device may be provided in the conveying path upstream of the second cutting device.

The method for manufacturing electrode sheets and the electrode sheet manufacturing apparatus can be used as a method for manufacturing electrode sheets and an apparatus therefor in the manufacture of a battery having a wound electrode body obtained by laminating and winding electrode sheets and belt-shaped separators together.

Figure 1:
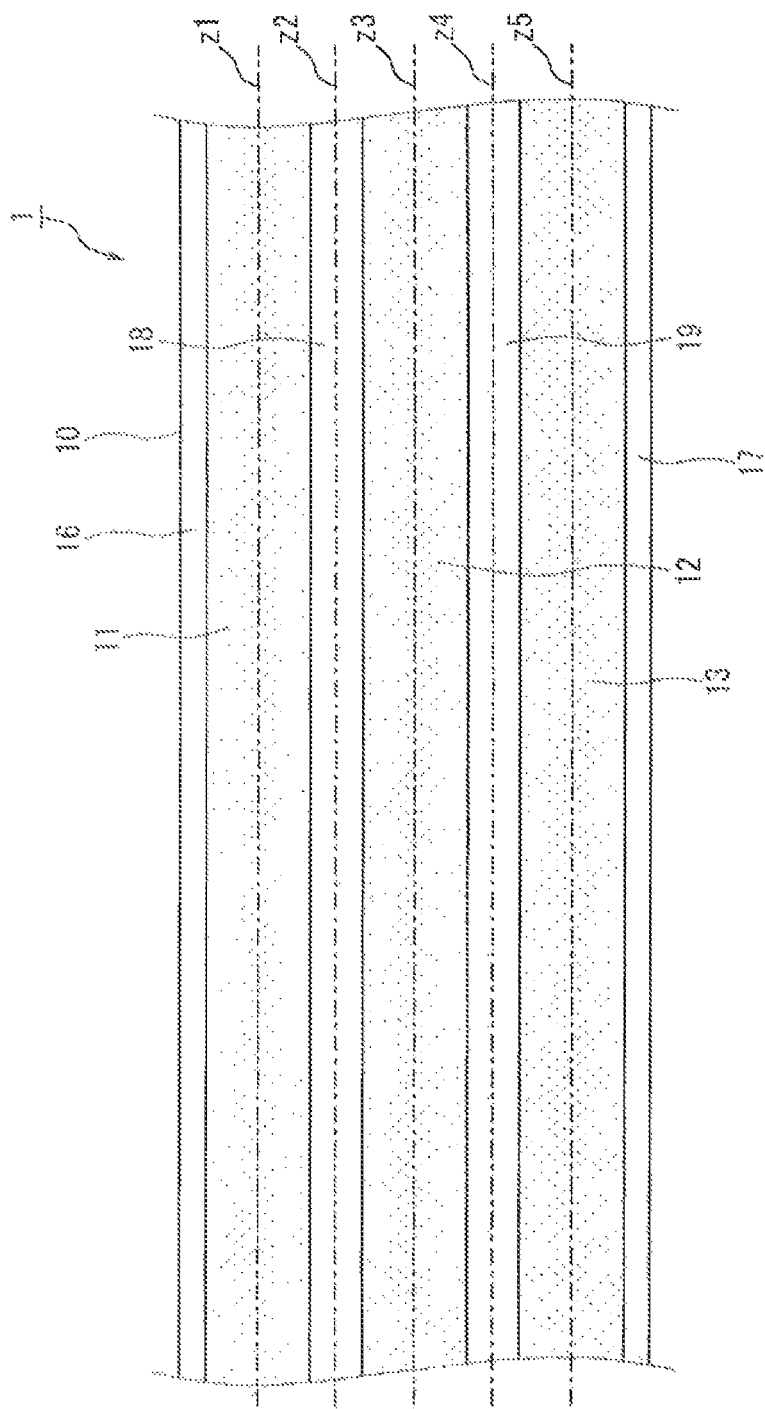
FIG. 1 is a plan view illustrating an original sheet that is used in the method for manufacturing electrode sheets of an embodiment of the present invention.

EXPLANATION OF REFERENCE NUMERALS 1 original sheet
1a, 1b, 1c cut original sheet strips
5a to 5f electrode sheets
10 metal foil (collector)
11 to 13 coated portions (electrode material)
16 to 19 uncoated portions
100 manufacturing apparatus
102 conveying mechanism
104 first cutting device
104a, 104b slitters (cutters)
106 gap adjusting device
108 speed adjusting mechanism
108a dancer roll
108b reserver mechanism
110 rolling device
110a, 110b roll
112 distortion correcting device
112a correction roller
112a1, 112a2 taper portion (section that supports the uncoated portion)
114 second cutting device
114a to 114c slitter
120a, 120b position adjusting mechanism
121 feed reel
126, 127 winding device
128 guide roller
300 battery case
301 positive electrode terminal
303 negative electrode terminal
310 wound electrode body
311 positive electrode sheet (electrode sheet)
311a coated portion
311b uncoated portion
311b1 positive electrode collector
311c collector sheet (metal foil)
311d electrode material
312, 314 separator
313 negative electrode sheet (electrode sheet)
313a coated portion
313b uncoated portion
313b1 negative electrode collector
313c collector sheet (metal foil)
313d electrode material
401 cutting device
402 guide roller
403a, 403b guide roll mechanism
410, 410a, 410b cleaner
420, 420a, 420b inspection device
430, 430a, 430b winding device
432 winding reel
434 friction shaft
434a shaft portion
434b torque-imparting portion
434c gap-maintaining ring
436 spacer
441 rotary shaft
442 tendency drive roller bearing
443 shell
446 frame
447 bearing
500 original sheet
505a to 505f sheet strips (electrode sheets)
1000 battery assembly
1001 vehicle
1041, 1141 movable blade
1042, 1142 fixed blade
1043, 1143 rocking arm
z1 to z5 cutting line

DETAILED DESCRIPTION OF THE INVENTION

The electrode sheet manufacturing method and manufacturing apparatus of an embodiment of the present invention will be described below with reference to the appended drawings.

Figure 2:
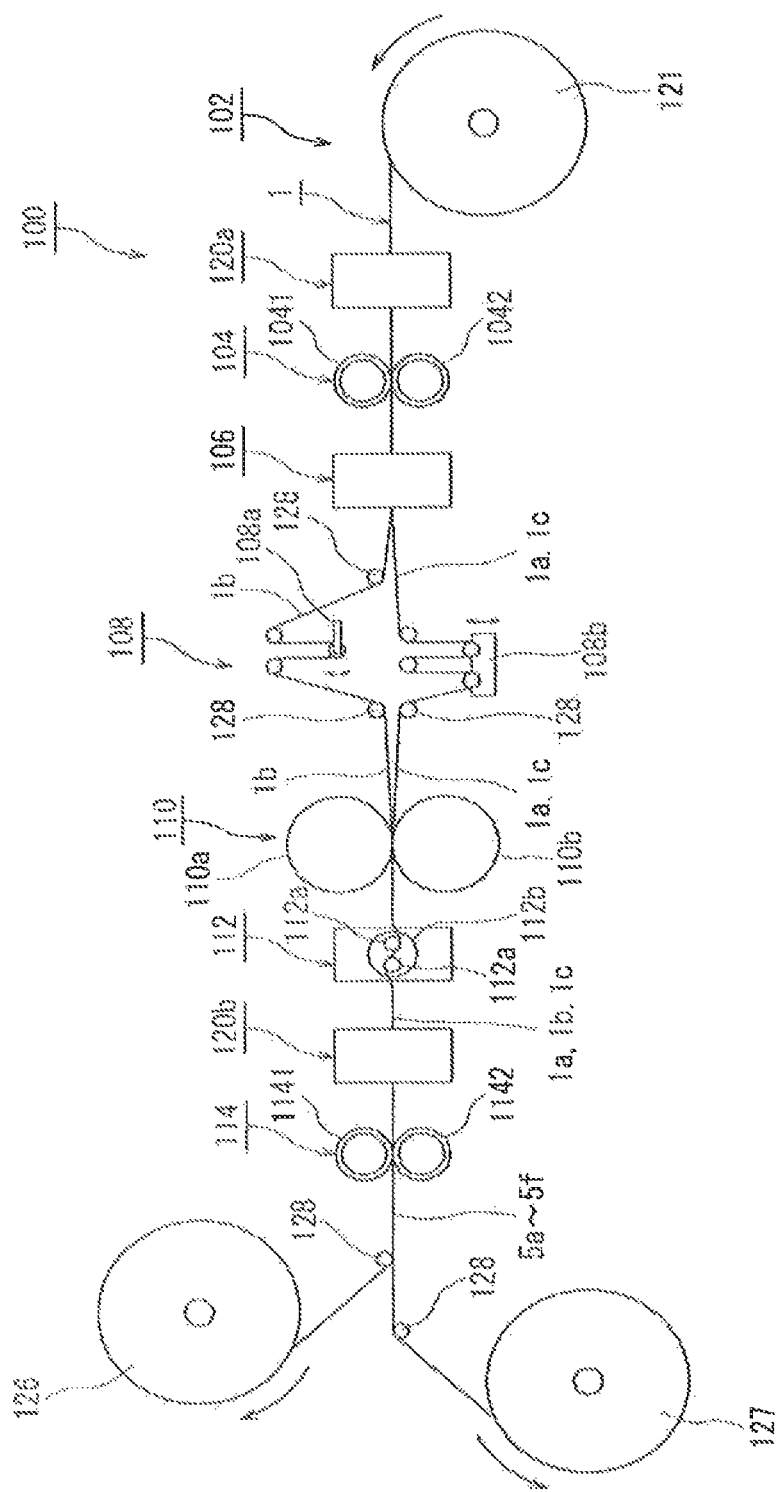
FIG. 2 shows a configuration of the electrode sheet manufacturing apparatus of the embodiment of the present invention.

As shown in FIG. 2, the electrode sheet manufacturing apparatus 100 includes a conveying mechanism 102, a first cutting device 104, a gap adjusting device 106, a speed adjusting mechanism 108, a rolling device 110 (press device), a distortion correcting device 112, a second cutting device 114, and position adjusting mechanisms 120a, 120b.

<<Conveying Mechanism 102>>

The conveying mechanism 102 conveys an original sheet 1 has a plurality of coated portions 11, 12, 13 coated with an electrode material on a metal foil 10 (collector). In the present embodiment, the conveying mechanism 102 pulls the original sheet 1 from a feed reel 121 and successively conveys the original sheet 1 to the first cutting device 104, the gap adjusting device 106, the speed adjusting mechanism 108, the rolling device 110, the distortion correcting device 112, and the second cutting device 114. The conveying mechanism 102 is provided with a plurality of guide rollers 128 for guiding the original sheet 1. The original sheet 1 is cut by the first cutting device 104 and then further divided (cut) into a plurality of electrode sheets $5a$ to $5f$ by the second cutting device 114. Each of the plurality of electrode sheets $5a$ to $5f$ is wound into rolls by respective winding devices 126, 127.

<<Original Sheet 1>>

As shown in FIG. 1, the original sheet 1 has the plurality of coated portions 11, 12, 13 coated with the electrode material on the wide metal foil 10. In this embodiment, the original sheet 1 has the three of coated portions 11, 12, 13 coated with an electrode material in the lengthwise direction of the metal foil 10. And the original sheet 1 has predetermined wide uncoated portions 16, 17 not coated with the electrode material at both edges in the widthwise direction. On the inside of the aforementioned uncoated portions 16, 17, the plurality of coated portions 11, 12, 13 are formed to have a predetermined width with a predetermined gap, and a plurality of uncoated portions 18, 19 are provided respectively between the coated portions 11 and 12 and between the coated portions 12 and 13. The uncoated portions 18, 19 are almost twice as wide as the uncoated portions 16, 17 at both sides. The coated portions 11, 12, 13 are formed in the same position on both surfaces of the metal foil 10, and the original sheet 1 is wound on the feed reel 121 after the electrode material of the coated portions 11, 12, 13 have been dried.

As shown in FIG. 1, in the original sheet 1, cutting lines $z1$ to $z5$ are set on the center in the widthwise direction of the coated portions 11, 12, 13 and between the coated portions 11, 12, 13. By cutting along these cutting lines $z1$ to $z5$, a plurality (six in the present embodiment) of electrode sheets can be cut out, each of which is coated with the electrode material on one side in the widthwise direction of the belt-shaped metal foil 10 with a predetermined width.

<<First Cutting Device 104, First Cutting Step>>

Figure 3:
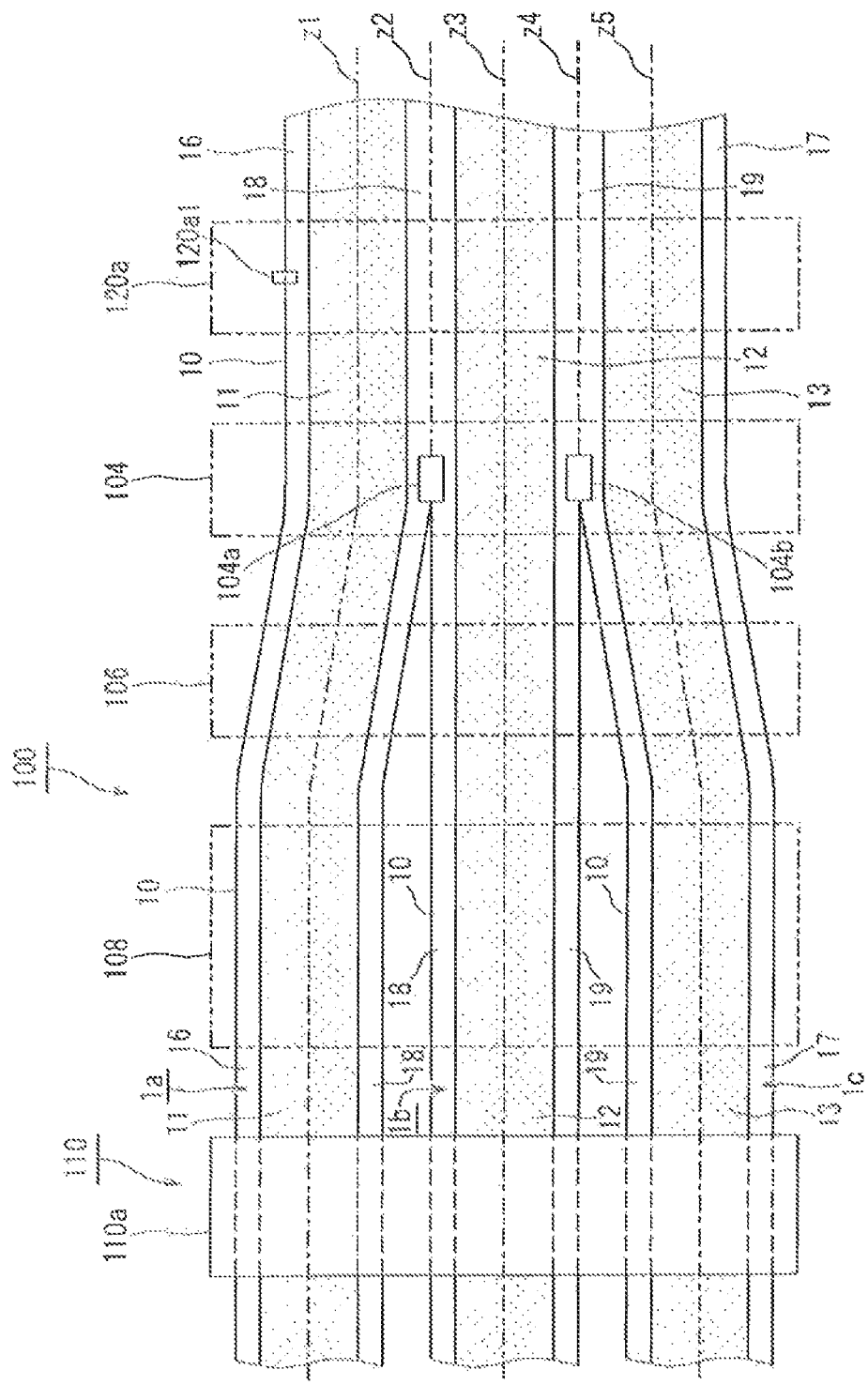
FIG. 3 is a plan view illustrating the process from the first cutting step to the pressing step of the method for manufacturing electrode sheets of the embodiment of the present invention.

The first cutting device 104 cuts the original sheet 1 conveyed by the conveying mechanism 102 as shown in FIG. 2 and FIG. 3. In the present embodiment, as shown in FIG. 3, the first cutting device 104 cuts the original sheet 1 along the cutting lines $z2$, $z4$ that are set on the uncoated portions 18, 19 between the coated portions 11, 12, 13 coated with the electrode material. The first cutting device 104 is provided with a plurality of slitters 104a, 104b correspondingly to the cutting lines $z2$, $z4$. Any of a variety of slitters (cutters) that can adequately cut the metal foil 10 may be used for the slitters 104a, 104b. The material and thickness of the metal foil in the electrode sheet differ depending on the battery or positive electrode and negative electrode. Therefore, it is preferred that the slitters 104a, 104b be used such in which cutting conditions can be adequately changed correspondingly to the material and thickness of the metal foil 10.

<<Position Adjusting Mechanism 120a>>

The position adjusting mechanism 120a is installed in the conveying path upstream of the first cutting device 104. The position adjusting mechanism 120a may use, for example, an EPC device (edge position control device) or a CPC device (center position control device) in which a detection device for detecting the position of the original sheet 1 is combined with a correction mechanism for correcting the position of the original sheet 1. As shown in FIG. 3, the EPC device has a sensor 120a1 detecting an edge position of the original sheet 1 and corrects the position of the original sheet 1 in the widthwise direction to match the edge position on the basis of the detection result of the sensor 120a1. The illustration of the mechanism for correcting the widthwise direction position of the original sheet 1 is omitted in figures. Further, the CPC device (not shown in the figure) detects a center portion of the original sheet 1 by detecting an edge position at both sides of the original sheet 1 and corrects a position of the original sheet 1 in the widthwise direction to match the center position.

Both the EPC device and the CPC device can be used as a mechanism for adjusting the position of the original sheet 1. In particular, the EPC device may be used when the edge position is wished to be controlled, and the CPC device may be used when the center position is wished to be controlled. In the present embodiment, the EPC device is used as the position adjusting mechanism 120a for controlling the position of the original sheet 1 fed to the first cutting device 104.

The position adjusting mechanism 120a can adequately match the cutting lines $z2$, $z4$ of the original sheet 1 with the slitters 104a, 104b of the first cutting device 104.

<<Gap Adjusting Device 106, Gap Adjusting Step>>

The original sheet 1 having slits introduced into the cutting lines $z2$, $z4$ by the first cutting device 104 is fed to the gap adjusting device 106. As shown in FIG. 3, the gap adjusting device 106 widens the gap of each of the original sheet strips $1a$, $1b$, $1c$ having been cut by the first cutting device 104. Thus, the slits introduced into the cutting lines $z2$, $z4$ by the first cutting machine 104 are expanded and the gap of each of the original sheet strips $1a$, $1b$, $1c$ is adjusted. Such a mechanism may use a mechanism for correcting the position of the conveyed sheet, such as a tilted roll of a fixed bar (not shown in the figure). In the present embodiment, the gap of each of the original sheet strips $1a$, $1b$, $1c$ having been cut by the first cutting device 104 is expanded by the gap adjusting device 106. Therefore, the edges of the original sheet strips $1a$, $1b$, $1c$ are prevented from rubbing against each other and the occurrence of foreign matter can be prevented.

In the present embodiments, as shown in FIG. 3, the conveying path of the central original sheet $1b$ from among the original sheet strips $1a$, $1b$, $1c$ having been cut by the first cutting device 104 and the conveying path of the original sheet 1 before the cutting are set along the same straight line $z3$. As a result, a tension acts adequately between the original sheet strips $1a$, $1b$, $1c$ after the cutting and the original sheet 1 before the cutting, and the original sheet 1 before the cutting can be adequately conveyed.

<<Speed Adjusting Mechanism 108, Speed adjusting Step>>

The speed adjusting mechanism 108 adjusts a speed to feed the original sheet strips $1a$, $1b$, $1c$ cut by the first cutting device 104 to the rolling device 110.

In the present embodiment, where the gap of each of the original sheet strips $1a$, $1b$, $1c$ is adjusted by the gap adjusting device 106, a difference occurs each of the path lengths of the original sheet strips $1a$, $1b$, $1c$. Further, in some cases, as the original sheet strips $1a$, $1b$, $1c$ do not have a uniform thickness in each of the coating portions 11, 12, 13, a difference occurs in rolling ratio (amount of the rolling) between the original sheet strips $1a$, $1b$, $1c$ in the rolling device 110. As shown in FIG. 3, where the original sheet strips $1a$, $1b$, $1c$ are fed to the rolling device 110, while the strips are conveyed in parallel, a difference in tension occurs between the original sheet strips $1a$, $1b$, $1c$ correspondingly to the difference in path length or difference in rolling amount and the original sheet strips cannot be conveyed smoothly.

In the present embodiment, the speed adjusting mechanism 108 is disposed upstream of the rolling device 110. The speed adjusting mechanism 108 selects the central original sheet strip $1b$ as a reference from among the original sheet strips $1a$, $1b$, $1c$ having been cut by the first cutting device 104, as shown in FIG. 2, and adjusts the speed of other original sheet strips 1a, 1c. The tension of the central original sheet strip 1b as a reference is adjusted by passing through a tension adjusting mechanism (in the present embodiment, a dancer roller 108a). The speed of feeding to the rolling device 110 is adjusted with a motor or a brake mechanism (not shown in the figure). The other original sheet strips 1a, 1c are passed through a reserver mechanism 108b for maintaining a predetermined tension and for changing the path length. The reserver mechanism 108b is operatively linked to the dancer roller 108a.

In the present embodiment, the speed of the other original sheet strips 1a, 1c is adjusted by the speed adjusting mechanism 108 with reference to the central original sheet strip 1b. As a result, the difference in tension between the original sheet strips 1a, 1b, 1c fed to the rolling device 110 can be eliminated and therefore the original sheet strips 1a, 1b, 1c can be smoothly conveyed to the rolling device 110.

In the present embodiment, the speed adjusting mechanism 108 adjusts the speed of the other original sheet strips 1a, 1c with reference to the central original sheet strip 1b, but any of the original sheet strips 1a, 1b, 1c may be taken as the reference original sheet strip. The reference original sheet strip may be adequately selected with consideration for mechanical configuration.

<<Rolling Device 110, Pressing Step>>

The rolling device 110 will be described below.

As shown in FIG. 2 and FIG. 3, the rolling device 110 is installed downstream of the first cutting device 104 in the conveying path of the conveying mechanism 102 and presses the original sheet strips 1a, 1b, 1c having been cut by the first cutting device 104. In the present embodiment, the rolling device 110 arranges side by side in the widthwise direction the original sheet strips 1a, 1b, 1c having been cut by the first cutting device 104 and presses them by squeezing between a pair of rolls 110a, 110b.

In the pressing step, the density of the electrode material can be increased by rolling the original sheet strips 1a, 1b, 1c and the performance of the battery per unit capacity can be increased. Further, by pressing with the rolling device 110, the original sheet strips 1a, 1b, 1c can be rolled and electrode sheets of adequate thickness can be obtained. As will be described below, the electrode sheets constituting a secondary battery are wound upon laminating with a separator interposed therebetween. In this case, where the electrode sheets have an adequate thickness, the spread in thickness of the wound bodies can be inhibited and displacement during winding can be also prevented.

Figure 4:
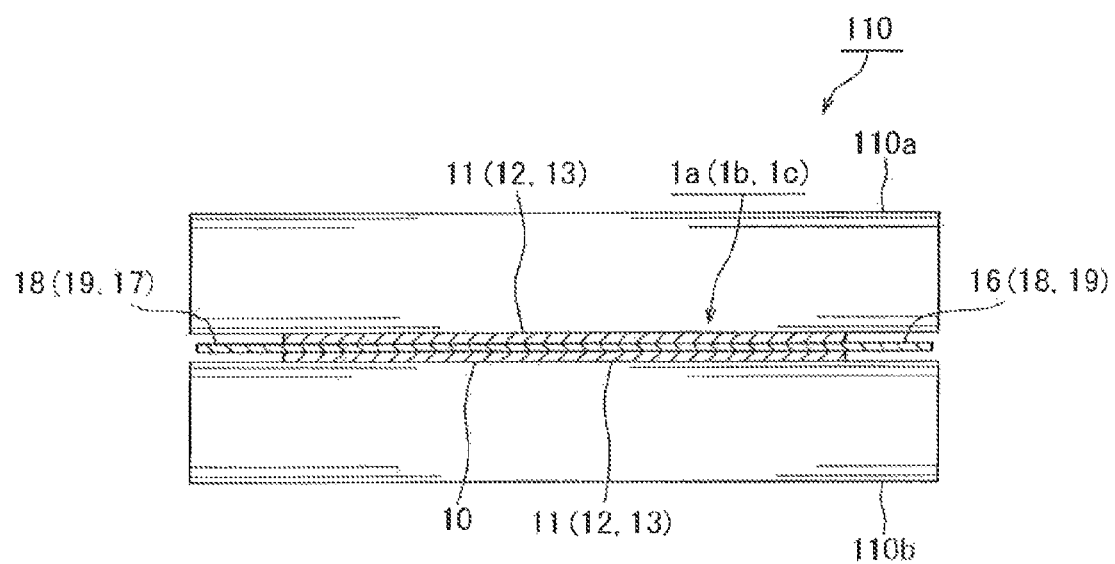
FIG. 4 is a plan view illustrating the pressing step of the method for manufacturing electrode sheets of the embodiment of the present invention.

In the present embodiment, as shown in FIG. 4, each of the original sheet strips 1a, 1b, 1c has the coated portion (the electrode material 11 to 13) coated with the electrode material on the metal foil 10. In this case, where rolling is conducted by a pair of rolls 110a, 110b, in the coated portion 11 (12, 13) coated with the electrode material, a pressure acts upon the metal foil 10 and the metal foil 10 elongates. In this case, the metal foil 10 elongates not only in the widthwise direction, but also in the lengthwise direction. By contrast, no pressure is produced on the uncoated portions 16, 18 ((18, 19), (19, 17)) and practically no elongation of the metal foil 10 occurs, as compared with the coated portion 11 (12, 13).

Figure 5:
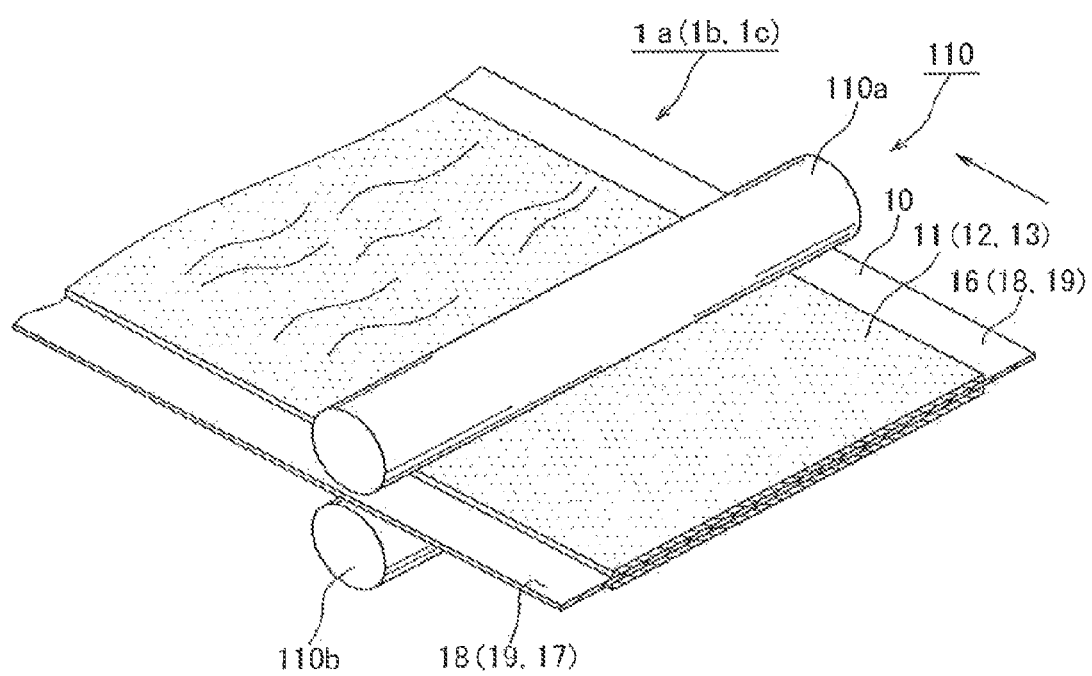
FIG. 5 is a perspective view illustrating the pressing step of the method for manufacturing electrode sheets of the embodiment of the present invention.

Therefore, when the original sheet strips are caused to pass through the rolling device 110, as shown in FIG. 5, a difference in elongation in the lengthwise direction occurs between the coated portion 11 (12, 13) and uncoated portions 16, 18 ((18, 19), (19, 17)). Because of this difference, the original sheet strips 1a, 1b, 1c are distorted. It is desirable that this distortion be corrected as thoroughly as possible. For this purpose, in the present embodiment, the distortion correcting device 112 is disposed downstream of the rolling device 110 in the conveying path.

<<Distortion Correcting Device 112, Distortion Correcting Step>>

Figure 6:
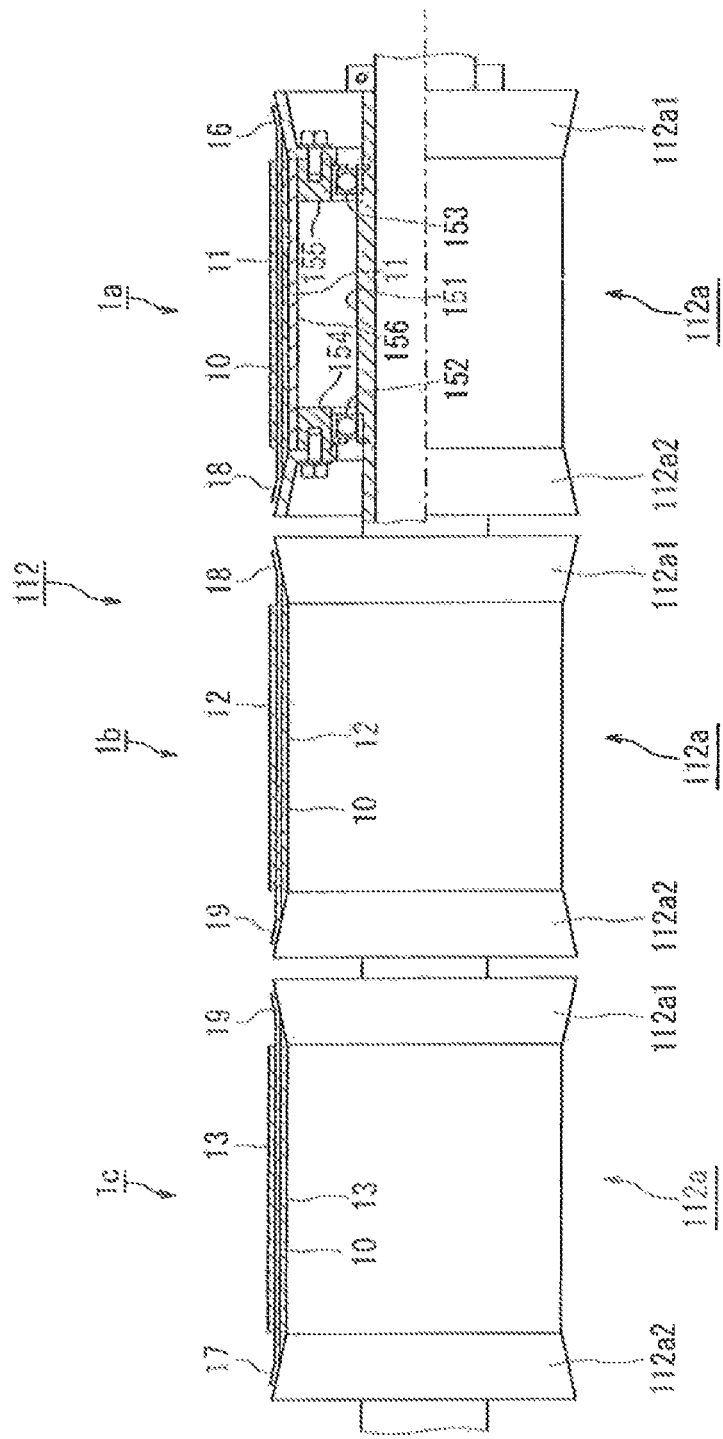
FIG. 6 is a front view illustrating a correction roller of the electrode sheet manufacturing apparatus of the embodiment of the present invention.

The distortion correcting device 112 corrects the distortion of the original sheet strips 1a, 1b, 1c having been cut by the first cutting device 104. As shown in FIG. 2 and FIG. 6, the distortion correcting device 112 has correction rollers 112a for catching the original sheet strips 1a, 1b, 1c.

Figure 7:
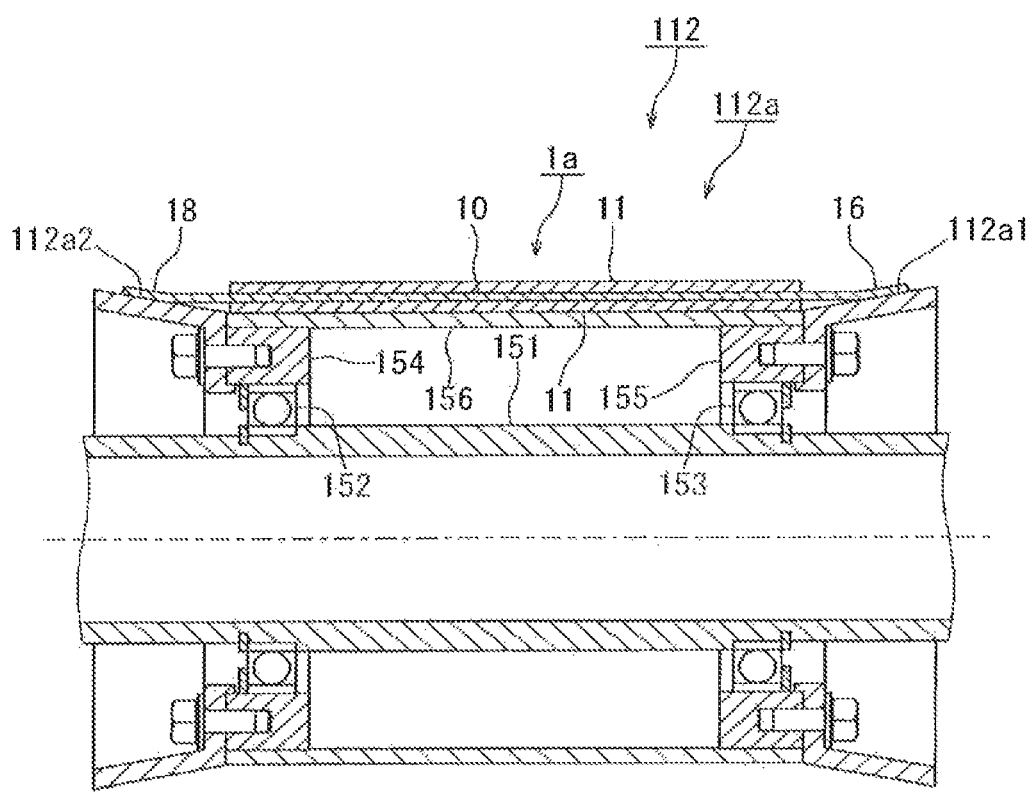
FIG. 7 is a cross-sectional view illustrating a correction roller of the electrode sheet manufacturing apparatus of the embodiment of the present invention.

As shown in FIG. 6 and FIG. 7, in the outer diameter of the correction roller 112a, the sections 112a1, 112a2 that support the uncoated portions (16, 18), (18, 19), (19, 17) are thicker than the sections that support the coated portions 11, 12, 13 of the original sheet strips 1a, 1b, 1c.

Where each of the original sheet strips 1a, 1b, 1c is caught on the correction rollers 112a, the uncoated portions (16, 18), (18, 19), (19, 17) at both widthwise ends are extended greater than the coated portions 11, 12, 13 in the intermediate sections. In particular, the sections 112a1, 112a2 that support the uncoated portions (16, 18), (18, 19), (19, 17) are enlarged in a taper-like fashion from the inside to the outside. As a result, the uncoated portions (16, 18), (18, 19), (19, 17) are uniformly extended in the lengthwise direction when passing through the correction roller 112a.

The amount of occurring distortion differs depending on such factors as the material and thickness of the metal foil and the coated amount of the electrode material. Therefore, the degree of tapering of the sections 112a1, 112a2 that support the uncoated portions 16, 18 ((18, 19), (19, 17)) may be adjusted by changing such factors as the material of the metal foil and amount of distortion.

In the present embodiment, as shown in FIG. 2, two correction rollers 112a are mounted on the same rotary mechanism 112b and the front and back surfaces of the original sheet strips 1a, 1b, 1c are successively caught on the two rollers 112a. In this case, the angle of the rotary mechanism 112b may be adjusted by such factors as the material of the metal foil and amount of distortion.

In the present embodiment, the configuration enables the replacement of the sections 112a1, 112a2 that support the uncoated portions 16, 18 ((18, 19), (19, 17)), as shown in FIG. 7. Thus, in the present embodiment, in the correction roller 112a, spacers 154, 155 are rotatably mounted on a shaft member 151, with bearings 152, 153 being interposed therebetween. Further, a cylindrical member 156 constituting the intermediate portion of the correction roller 112a is mounted on the spacers 154, 155. The sections 112a1, 112a2 that support the uncoated portions 16, 18((18, 19), (19, 17)) are constituted by members separate from the intermediate portion and attached to both sides of the spacers 154, 155. Therefore, the degree of tapering can be changed by replacing only the sections 112a1, 112a2. These sections 112a1, 112a2 may be changed to optimum sections when the electrode sheet that is to be manufactured by the above-described process is changed, more specifically when the conditions such as the metal foil and coating amount of the electrode material are changed. As a result, the utility of equipment can be ensured.

Figure 19:
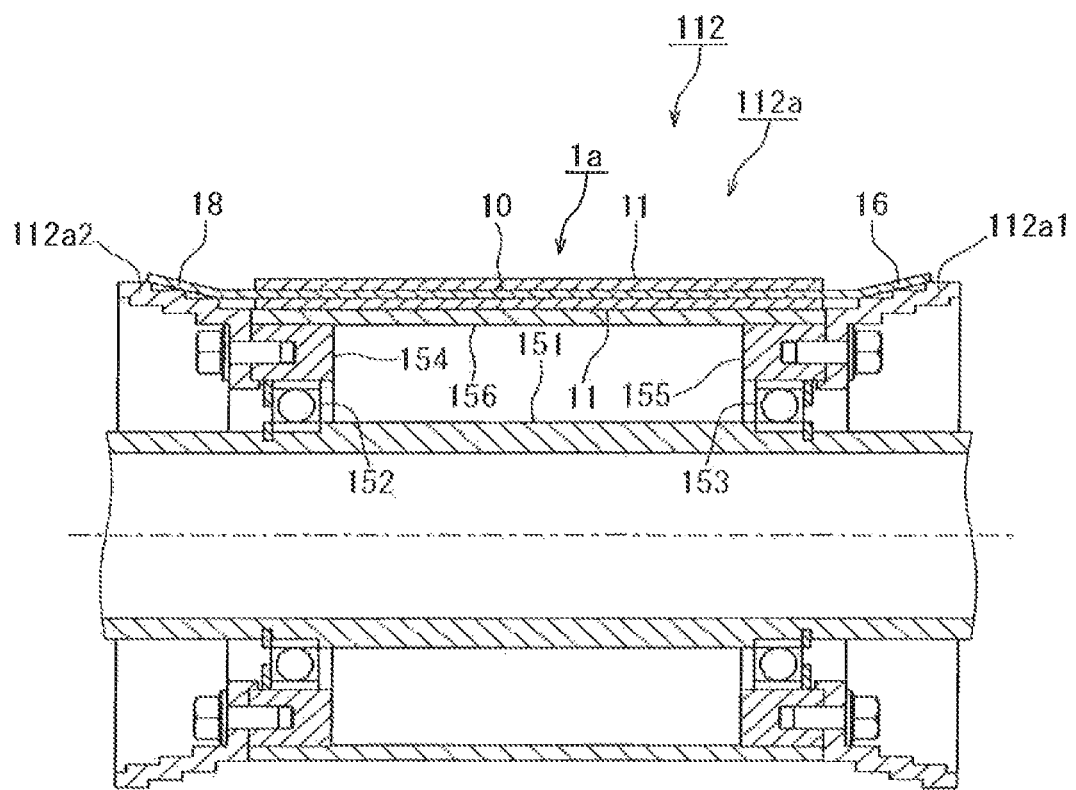
FIG. 19 is a cross-sectional view illustrating a correction roller of the electrode sheet manufacturing apparatus of another embodiment of the present invention.

With the above-described distortion correcting device 112, as shown in FIG. 6 and FIG. 7, the sections 112a1, 112a2 that support the uncoated portions (16, 18), (18, 19), (19, 17) are tapered to increase in thickness from the inside to the outside in the axial direction. The correction roller 112a is not limited to such a mode. For example, as shown in FIG. 19, the sections 112a1, 112a2 that support the uncoated portions 16, 18 of the correction roller 112a may have a step to provide for increase in thickness from the inside toward the outside. In this case, the uncoated portions 16, 18 may be also elongated uniformly in the lengthwise direction when they pass the correction roller 112a. In such a configuration, the sections 112a1, 112a2 that support the uncoated portions 16, 18 also may be replaceable. In such a case, it is possible to replace the sections 112a1, 112a2 that support the uncoated portions 16, 18 and change the shape or level of step. These sections 112a1, 112a2 may be changed to optimum sections when the electrode sheet that is to be manufactured by the above-described process is changed, more specifically when the conditions such as the metal foil and coating amount of the electrode material are changed. As a result, the utility of equipment can be ensured.

Figure 8:
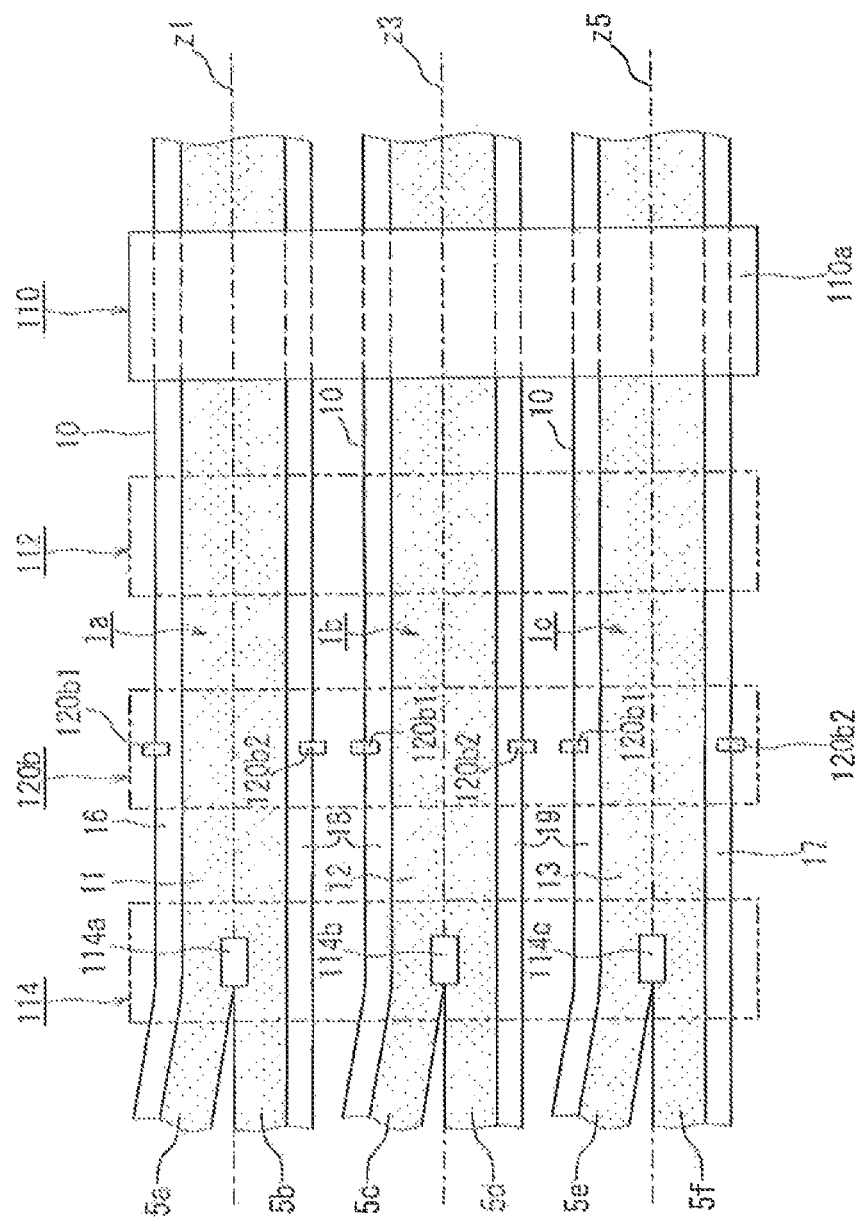
FIG. 8 is a plan view illustrating the process from the pressing step to the second cutting step of the method for manufacturing electrode sheets of the embodiment of the present invention.

The original sheet strips 1a, 1b, 1c in which the distortions have been corrected by the distortion correcting device 112 are fed as shown in FIG. 2 and FIG. 8 to the second cutting device 114.

<<Second Cutting Device 114, Second Cutting Step>>

The second cutting device 114 cuts the original sheet strips 1a, 1b, 1c at the coated portions 11, 12, 13 after pressing with the rolling device 110 as shown in FIG. 2.

Thus, in the present embodiment, as shown in FIG. 3 and FIG. 8, the cutting lines z1, z3, z5 for cut by the second cutting device 114 are set on the centers of the coated portions 11, 12, 13 of the original sheet strips 1a, 1b, 1c in the widthwise direction.

In the present embodiment, the second cutting device 114 is provided with three slitters 114a, 114b, 114c correspondingly to the cutting lines z1, z3, z5. The positions of the three slitters 114a, 114b, 114c in the widthwise direction are fixed with respect to the conveying direction of the original sheet strips 1a, 1b, 1c. Therefore, the original sheet strips 1a, 1b, 1c have to be conveyed so that the centers of the coated portions 11, 12, 13 of the original sheet strips 1a, 1b, 1c in the widthwise direction match the slitters 114a, 114b, 114c. For this purpose, the position adjusting mechanism 120b is installed upstream of the second cutting device 114.

Further, in the present embodiment, a CPC device (center position control device) is used as the position adjusting mechanism 120b. In the position adjusting mechanism 120b, as shown in FIG. 8, the edge positions of both sides of the original sheet strips 1a, 1b, 1c are detected by sensors 120b1, 120b2 installed at both sides of the original sheet strips 1a, 1b, 1c. The center positions (cutting lines z1, z3, z5) of the original sheet strips 1a, 1b, 1c are found out on the basis of the edge positions detected by the sensors 120b1, 120b2, the these center positions are matched with the slitters 114a, 114b, 114c of the second cutting device 114.

Thus, the cutting lines z1, z3, z5 of the original sheet strips 1a, 1b, 1c can be adequately matched with the slitters 114a, 114b, 114c.

The slitters 114a, 114b, 114c that can adequately cut the metal foil 10 coated with the electrode material may be used in the second cutting device 114. For example, the slitters may be selected from the well-known slitters (cutters) that can perform the required function. Further, in the electrode sheets, the material and thickness of the metal foil and also the coated electrode material and the thickness thereof differ depending on the battery type and also on whether the electrode is a positive electrode or a negative electrode. Therefore, the slitters 114a, 114b, 114c may be advantageously used such that make it possible to change the cutting conditions adequately correspondingly to the original sheet strips 1a, 1b, 1c.

The plurality (six in the present embodiment) of the electrode sheets 5a to 5f can be obtained by dividing (cutting) the original sheet strips 1a, 1b, 1c with the second cutting device 114.

Further, in the present embodiment, as shown in FIG. 8, each of the conveying paths of the electrode sheets 5b, 5d, 5f from among the electrode sheets 5a to 5f divided (cut) by the second cutting device 114 and each of the conveying paths of the original sheet strips 1a, 1b, 1c before the cutting are set along the same respective lines z1, z3, z5. As a result, a tension adequately acts between the electrode sheets 5a to 5f divided (cut) by the second cutting device 114, and the original sheet strips 1a, 1b, 1c before the cutting can be adequately conveyed.

Further, in the present embodiment, the conveying path of the electrode sheet 5d and the conveying path of the original sheet 1 before it is cut by the first cutting device 104 are set along the same straight line z3 (in the present embodiment, z3 is a central line in the widthwise direction of the original sheet 1 before it is cut by the first cutting device 104). As a result, a tension acts adequately between the original sheet 1 before it is cut by the first cutting device 104 and the electrode sheets 5a to 5f that were divided (cut) by the second cutting device 114, and the original sheet 1 before the cutting can be adequately conveyed.

Thus, the electrode sheets 5a to 5f having been divided (cut) are wound up by winding devices 126, 127 as shown in FIG. 2.

With the electrode sheet manufacturing apparatus 100, as shown in FIG. 3, the original sheet 1 is cut by the first cutting device 104 between the coated portions 11, 12, 13 coated with the electrode material. The original sheet strips 1a, 1b, 1c obtained by such cutting are pressed by the rolling device 110. As a result, in the pressing step, the original sheet strips 1a, 1b, 1c do not interfere with each other and the occurrence of wrinkles in the original sheet strips 1a, 1b, 1c can be inhibited.

Thus, as shown in FIG. 1, when the original sheet 1 having a plurality of coated portions 11, 12, 13 is pressed as is, the metal foil 10 is not elongated in the uncoated portions 16 to 19, whereas the metal foil is elongated in the coated portions 11 to 13. As a result, wrinkles occur in the original sheet strips 1a, 1b, 1c.

By contrast, in the present embodiment, the original sheet strips 1a, 1b, 1c that are pressed by the rolling device 110 are independent from each other. As a result, the effect produced by the rolling of the coated portions 11, 12, 13 remains in the original sheet strips 1a, 1b, 1c. Therefore, the distortions occurring in the original sheet strips 1a, 1b, 1c can be prevented from affecting each other and the occurrence of wrinkles can be inhibited.

Because the first cutting device 104 cuts only the uncoated portions 18, 19, the cutting conditions can be easily set. Thus, in the original sheet 1, as shown in FIG. 1, the cutting lines z1 to z5 are set on the coated portions 11, 12, 13 and uncoated portions 18, 19. In this case, the cutting conditions differ between the cutting lines z1, z3, z5 having been set for the coated portions 11, 12, 13 and the cutting lines z2, z4 having been set for the uncoated portions 18, 19. In the present embodiment, only the cutting lines z2, z4 having been set on the uncoated portions 18, 19 are cut by the first cutting device 104. Therefore, the cutting conditions of the first cutting device 104 can be easily set.

In the present embodiment, in the conveying mechanism the position adjusting mechanism 120a that adjusts the widthwise position of the original sheet 1 supplied to the first cutting device 104 is installed upstream of the first cutting device 104. Therefore, the positions of the cutting lines z2, z4 having been set for the uncoated portions 18, 19 of the original sheet 1 can be adequately matched with the first cutting device 104. As a result, the original sheet 1 can be accurately cut by the cutting lines z2, z4.

In the present embodiment, as shown in FIG. 2, the rolling device 110 has a pair of rolls 110a, 110b. Further, as shown in FIG. 3, the original sheet strips 1a, 1b, 1c having been cut by the first cutting device 104 are arranged side by side with the gap in the axial direction of the rolls 110a, 110b. In this state, the original sheet strips 1a, 1b, 1c are pressed by the rolling device 110. In this case, the conveying mechanism is not made more complex, the equipment cost is reduced, and the space can be saved by comparison with the case in which individual rolling devices are installed for each original sheet 1a, 1b, 1c.

Further, in the present embodiment, the speed adjusting mechanism 108 is provided in the conveying path between the first cutting device 104 and the rolling device 110. The speed conveying mechanism 108 adjusts the speed with which the original sheet strips 1a, 1b, 1c obtained by cutting by the first cutting device 104 are fed to the rolling device 110. Therefore, the tension of the original sheet strips 1a, 1b, 1c fed to the rolling device 110 can be adjusted and the original sheet strips 1a, 1b, 1c can be smoothly fed to the rolling device 110.

Further, in the present embodiment, as shown in FIG. 2, the second cutting device 114 that divides (cuts) the coated portions 11, 12, 13 of the original sheet strips 1a, 1b, 1c having been cut by the first cutting device 104 is provided in the conveying path downstream of the rolling device 110.

In this case, only the cutting lines z2, z4 having been set on the uncoated portions 18, 19 are cut by the first cutting device 104, and then the cutting lines z1, z3, z5 having been set on the coated portions 11, 12, 13 are cut by the second cutting device 114. Therefore, the cutting conditions of the second cutting device 114 can be easily set.

In the present embodiment, as shown in FIG. 2 and FIG. 8, the distortion correcting device 112 is installed between the rolling device 110 and the second cutting device 114 in the conveying path. The distortions having occurred in each of the original sheet strips 1a, 1b, 1c in the rolling device 110 are corrected by the distortion correcting device 112.

Thus, as shown in FIG. 4 and FIG. 5, when the original sheet passes through the rolling device 110, the metal foil elongates in the coated portions 11, 12, 13 on which the electrode material has been coated, whereas in the uncoated portions 16, 18 ((18, 19), (19, 17)), the metal foil does not elongate. As a result, distortions occur in each of the original sheet strips 1a, 1b, 1c when they pass through the rolling device 110. In the present embodiment, because the distortion correcting device 112 is installed between the rolling device 110 and the second cutting device 114, as shown in FIG. 2 and FIG. 8, the original sheet strips 1a, 1b, 1c can be fed to the second cutting device 114 upon correcting these distortions. As a result, the position of cutting with the second cutting device 114 can be adjusted with good accuracy.

Figure 9:
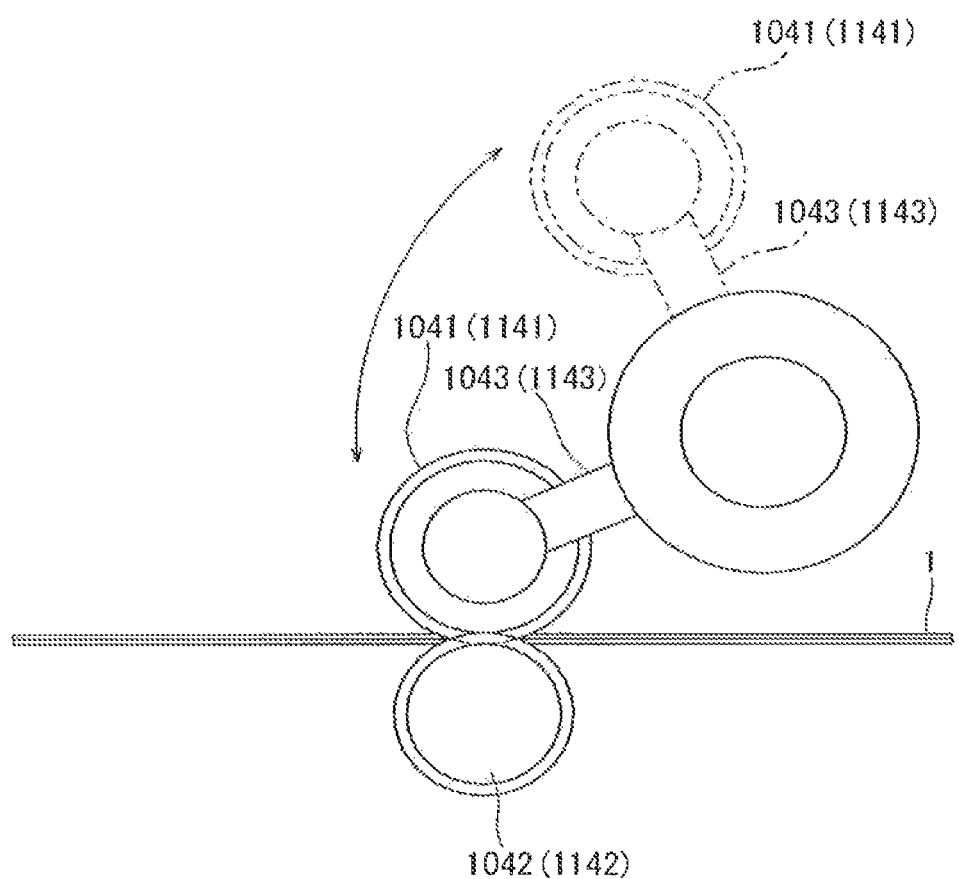
FIG. 9 is a side view illustrating the structure of the cutting machine of the electrode sheet manufacturing apparatus of the embodiment of the present invention.

In the present embodiment, as shown in FIG. 9 the first cutting device 104 and second cutting device 114 are configured so that cutting blades 1042, 1142 (fixed blades) on the front and rear piece side are fixed and the cutting blades 1041, 1141 (movable blades) on the opposite side can be moved. In this case, the movable blades 1041, 1141 may be configured to be mounted on linked rocking arms 1043, 1143 to enable integrated operation. With such a configuration, even when a plurality of the movable blades 1041, 1141 are provided, each of the advance amounts of the movable blades 1041, 1141 with respect to the fixed blades 1042, 1142 can be easily adjusted, only by adjusting the rocking amount of the rocking arms 1043, 1143.

Thus, in the present embodiment, the first cutting device 104 is provided, as shown in FIG. 3, with two slitters 104a, 104b with respect to the cutting lines z2, z4 having been set on the uncoated portions 18, 19. Further, the second cutting device 114 is provided, as shown in FIG. 8, with three slitters 114a, 114b, 114c with respect to cutting lines z1, z3, z5 having been set on the coated portions 11, 12, 13. In this case, as shown in FIG. 9, the movable blades 1041, 1141 may be configured to be mounted on linked rocking arms 1043, 1143 to enable integrated operation with respect to the fixed blades 1042, 1142. Because the advance amount of the movable blades 1041, 1141 with such a configuration is constant, the cutting conditions of the slitters 104a, 104b, 114a, 114b, 114c are easily matched.

Further, with the present embodiment, in the second cutting step, the plurality of original sheet strips 1a, 1b, 1c having been cut in the first cutting step arranged side by side to each other are cut. With such a configuration, it is not necessary to provide individual cutting devices for cutting the original sheet strips 1a, 1b, 1c and a configuration with a single cutting device can be used. The cutting conditions can be easily matched for the original sheet strips 1a, 1b, 1c. In this case, the conveying mechanism of the original sheet strips 1a, 1b, 1c is not made more complex, the equipment cost can be reduced, and the space can be saved.

The method for manufacturing electrode sheets of one embodiment of the present invention and the apparatus therefor are explained above, but the present invention is not limited to this embodiment.

For example, in the example shown above, the original sheet 1 has three coated portions coated with the electrode material, but the original sheet 1 can have more than three coated portions coated with the electrode material. Further, the dimensions in the drawings are appropriately simplified for the convenience of drafting and explanation. Therefore, the configuration of the apparatus 100 for manufacturing electrode sheets is not limited to that shown in the figure.

Further, the conveying mechanism may have general utility such that enables the use of the conveying mechanism even when the original sheet 1 is changed. Further, the positions of slitters in the first cutting device and second cutting device can be changed correspondingly to the cutting lines having been set on the coated portions and uncoated portions of the original sheet 1. The rolling device is preferably constituted by a pair of rollers, and the shape of rollers may be variously changed correspondingly to the original sheet 1. The present invention can be also variously changed irrespectively of the matters mentioned herein.

The electrode sheets obtained constitute, for example, a wound electrode body of various secondary batteries. For example, a lithium-ion secondary battery and a nickel-hydride secondary battery are examples of secondary batteries having a wound electrode body. An example of a lithium-ion secondary battery will be explained below.

Figure 12:
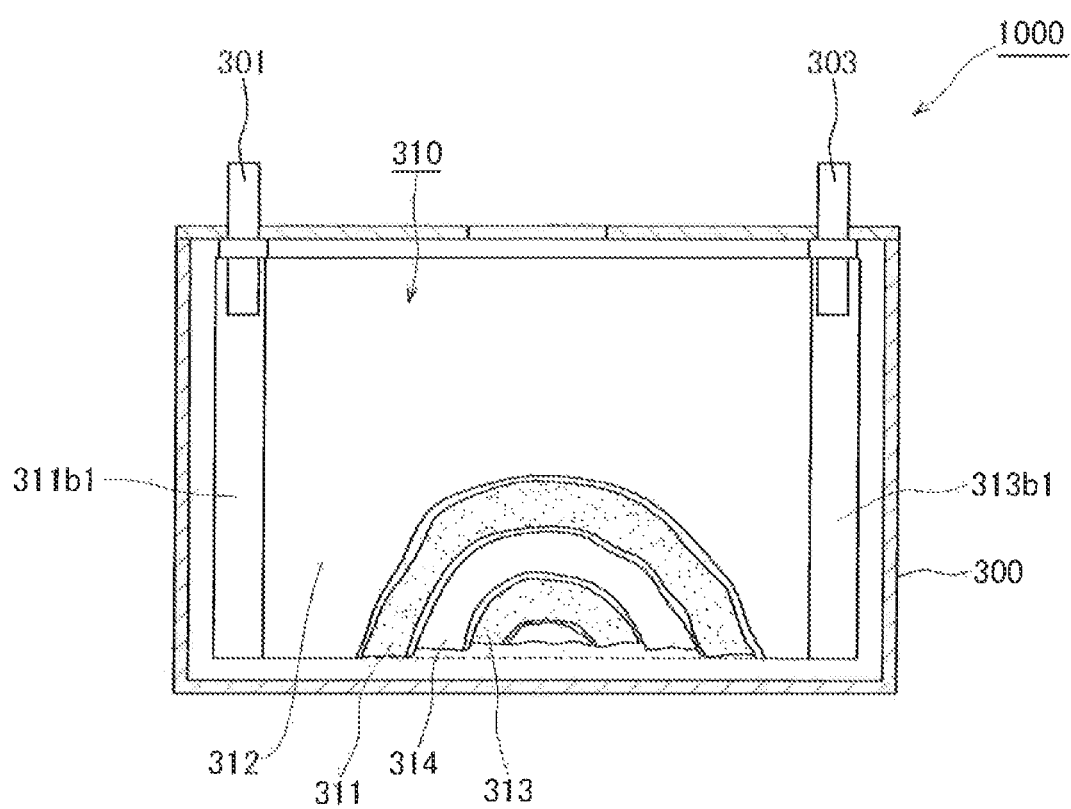
FIG. 12 illustrates a structural example of a storage battery.

A lithium-ion secondary battery is constituted, for example, as shown in FIG. 12, by a rectangular metallic battery case 300, and a wound electrode body 310 is accommodated in the battery case 300.

Figure 10:
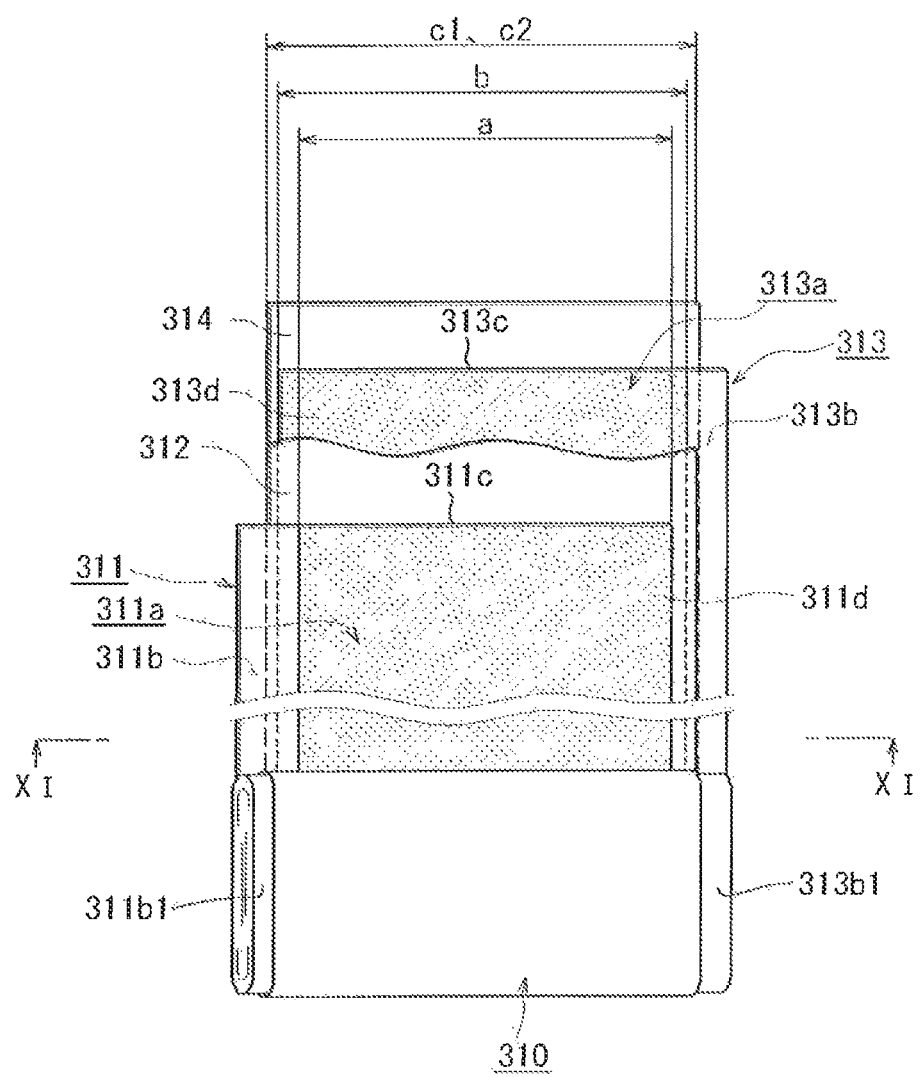
FIG. 10 illustrates a structural example of a wound electrode body.
Figure 11:
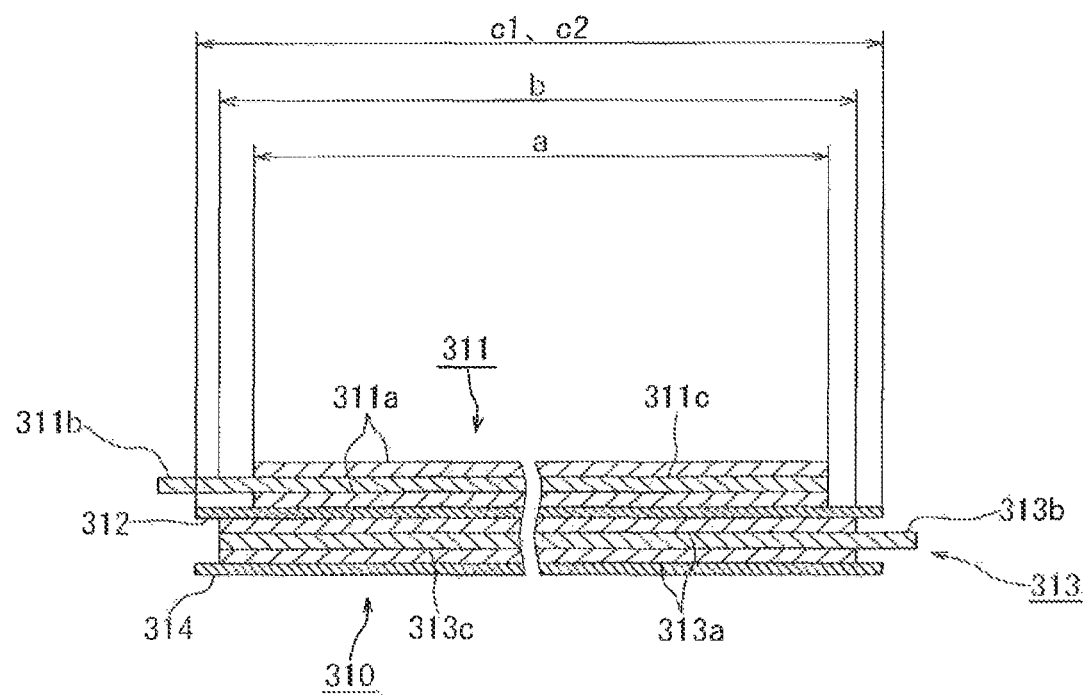
FIG. 11 illustrates a structural example of a wound electrode body.

In the present embodiment, the wound electrode body 310 is provided, as shown in FIG. 10 and FIG. 11, with a positive electrode sheet 311 and a negative electrode sheet 313 as belt-shaped electrodes. Further, a first separator 312 and a second separator 314 are provided as belt-shaped separators.

The positive electrode sheet 311, first separator 312, negative electrode sheet 313, and second separator 314 are laminated in the order of description and wound. The positive electrode sheet 311 and negative electrode sheet 313 correspond to the electrode sheets in accordance with the present invention. The positive electrode sheet 311 and negative electrode sheet 313 are positive and negative electrode sheets, respectively.

In the present embodiment, the positive electrode sheet 311 is manufactured by coating an electrode material 311d including a positive electrode active material on both sides of a collector sheet 311c (corresponds to the metal foil 10) composed of an aluminum foil. Examples of the positive electrode active material contained in the electrode material 311d include lithium manganese oxide ($LiMn_2O_4$), lithium cobalt oxide ($LiCoO_2$), and lithium nickel oxide ($LiNiO_2$).

In the present embodiment, the negative electrode sheet 313 is manufactured by coating an electrode material 313d including a negative electrode active material on both sides of a collector sheet 313c (corresponds to the metal foil 10) composed of a copper foil. Examples of the negative electrode active material contained in the electrode material 313d include carbon-containing materials such as graphite and amorphous carbon and lithium-containing transition metal oxides or transition metal nitrides.

The separators 312, 314 are films that can transmit ionic substances. In the present embodiment, microporous polypropylene membranes are used.

In the present embodiment, the electrode materials 311d, 313d are coated on one side in the widthwise direction of the collector sheets 311c, 313c and not coated on the edge portion on the opposite side in the widthwise direction of the collector sheets 311c, 313c. In the positive and negative electrode sheets 311 and 313, the zones in which the collector sheets 311c, 313c are coated the electrode material 311d, 313d are called coated portions 311a, 313a, and zones in which the collector sheets 311c, 313c are coated the electrode material 311d, 313d are called uncoated portions 311b, 313b FIG. 11 is a cross-sectional view in the widthwise direction illustrating how the positive electrode sheet 311, first separator 312, negative electrode sheet 313, and second separator 314 are successively laminated. The coated portion 311a of the positive electrode sheet 311 and the coated portion 313a of the negative electrode sheet 313 face each other with the separators 312, 314 being interposed therebetween. As shown in FIG. 10 and FIG. 11, the uncoated portions 311b, 313b of the positive electrode sheet 311 and negative electrode sheet 313 protrude beyond the separators 312, 314 at both sides in the direction (winding axis direction) perpendicular to the winding direction of the wound collector body 310. The uncoated portions 311b, 313b of the positive electrode sheet 311 and negative electrode sheet 313 form the collectors 311b1, 313b1 of the positive electrode and negative electrode of the wound electrode body 310.

In such a lithium-ion secondary battery, lithium ions pass through the belt-shaped separators 312, 314 between the coated portion 311a of the positive electrode sheet 311 and the coated portion 313a of the negative electrode sheet 313 during charging and discharging. In this case, it is preferred that the coated portion 311a of the positive electrode sheet 311 does not protrude beyond the coated portion 313a of the negative electrode sheet 313 in order to prevent the lithium ions from precipitating. By using a configuration in which the coated portion 311a of the positive electrode sheet 311 does not protrude beyond the coated portion 313a of the negative electrode sheet 313, it is possible to prevent the lithium ions from precipitating during charging and discharging.

In the present embodiment, as shown in FIG. 10 and FIG. 11, the coated portion 311a of the positive electrode sheet 311 is prevented from protruding beyond the coated portion 313a of the negative electrode sheet 313 by making the width (electrode width (a)) of the coated portion 311a of the positive electrode sheet 311 less than the width (electrode width (b)) of the coated portion 313a of the negative electrode sheet 313. Further, the coated portion 311a of the positive electrode sheet 311 and the coated portion 313a of the negative electrode sheet 313 do not protrude from the respective separators 312, 314 and the internal short circuit is thus prevented.

However, errors can occur in the manufacturing process or a widthwise displacement can occur when the positive electrode sheet 311, negative electrode sheet 313, and separators 312, 314 are laminated. Therefore, a difference (b−a) between the width (b) of the coated portion 313a of the negative electrode sheet 313 and the width (a) of the coated portion 311a of the positive electrode sheet 311 and a difference ((c1, c2)−b) between the widths (c1), (c2) of the first separator 312 and second separator 314 and the width (b) of the coated portion 313a of the negative electrode sheet 313 is set to predetermined distances to allow for such errors and displacement.

With the apparatus 100 for manufacturing electrode sheets according to the present invention, as shown in FIG. 1 a plurality of electrode sheets can be cut out from one original sheet 1 and the production cost of the electrode sheet can be reduced. Further, pressing is conducted when the electrode sheet is manufactured, but wrinkles occurring during pressing are reduced and therefore the electrode sheet with good accuracy can be obtained. As a result, the aforementioned difference (b−a) and difference ((c1, c2)−b) can be reduced. Further, wrinkles or distortions occurring in the electrode sheets 311, 313 can be reduced to a minimum. As a result, the occurrence of winding when the wound electrode body 310 is manufactured is prevented.

As shown in FIG. 12, the battery case 300 is provided with a positive electrode terminal 301 and a negative electrode terminal 303. The positive electrode terminal 301 is electrically connected to the positive electrode collector 311b1 of the wound electrode body 310 (see FIG. 10). The negative electrode terminal 303 is electrically connected to the negative electrode collector 313b1 of the wound electrode body 310 (see FIG. 10). An electrolytic solution is injected to the battery case 300. The electrolytic solution can be constituted by a nonaqueous electrolytic solution such as a mixed solvent, for example diethyl carbonate and ethylene carbonate, containing an appropriate amount of an appropriate electrolyte salt (for example, a lithium salt such as $LiPF_6$). Because the present invention makes it possible to manufacture the electrode sheets with good accuracy, the storage battery service life can be extended.

Figure 13:
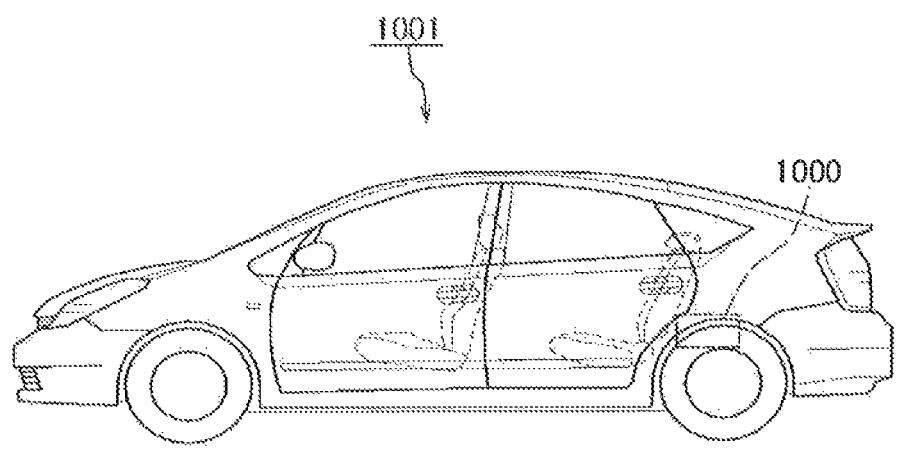
FIG. 13 illustrates an example of a vehicle on which a storage battery is installed as a power source.

A plurality of such lithium-ion secondary batteries is assembled to configure a battery assembly 1000 which is installed, for example as shown in FIG. 13, as a power source on a vehicle 1001. The present invention contributes to stability of battery performance and extension of service life.

Thus, the present invention is also useful as a method for manufacturing a secondary battery (storage battery) having a wound electrode body and a manufacturing apparatus therefor.

Another embodiment of the method for manufacturing electrode sheets and a manufacturing apparatus therefor will be described below.

In the above-described method for manufacturing electrode sheets, for example as shown in FIG. 1, a plurality of electrode sheets 5a to 5f (sheet strips) are obtained by cutting the original sheet 1 along the cutting lines z1 to z5 having been set on the lengthwise direction of the original sheet 1 with a predetermined gap in the widthwise direction of the original sheet 1. Thus, in the method for manufacturing electrode sheets, a plurality of sheet strips (electrode sheets) are obtained by cutting the original sheet along the lengthwise direction. The adjacent sheet strips in the plurality of cut sheet strips 5a to 5f need to be spaced from each other to prevent the edges of the sheet strips from rubbing against each other when the sheet strips are conveyed to the next process. However, when a plurality of sheet strips are obtained by cutting the original sheet, as the number of the sheet strips obtained by cutting is increased, the spatial margin is eliminated and a planar gap is difficult to expand.

<<Apparatus 400A>>

Figure 14:
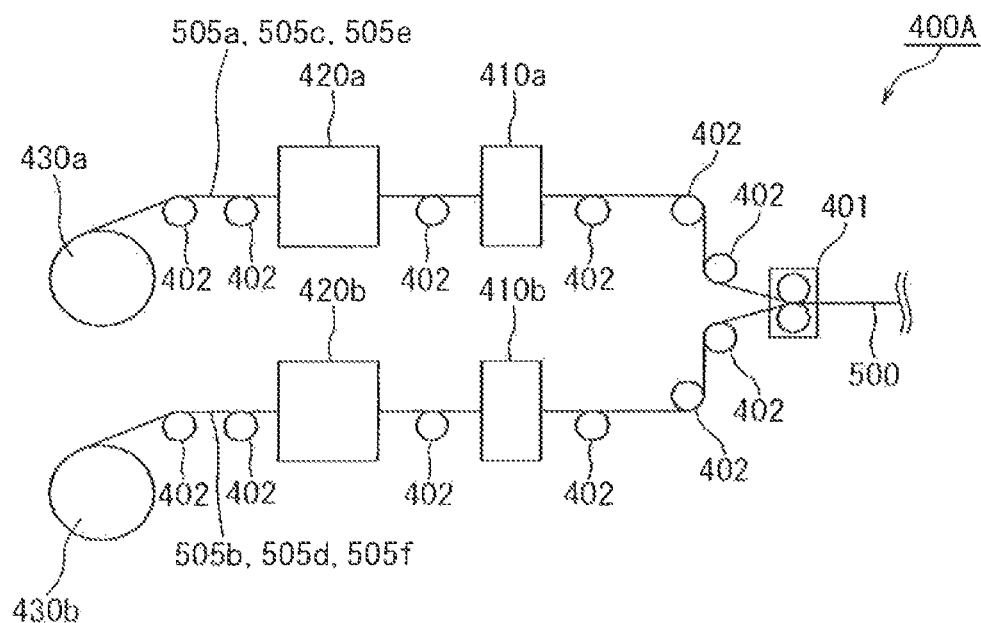
FIG. 14 illustrates the configuration of the electrode sheet manufacturing apparatus of the embodiment of the present invention.

The apparatus 400A shown in FIG. 14 is likewise used when a plurality of sheet strips 505a to 505f are obtained by cutting an original sheet 500 in the lengthwise direction along the cutting lines z1 to z5 (see FIG. 16) with a predetermined gap in the widthwise direction of the original sheet 500. With the apparatus 400A, the conveying can be conducted so that the edges of the plurality of cut sheet strips 505a to 505f are prevented from rubbing against each other. In this case, as shown in FIG. 14 in the apparatus 400A, first, the original sheet 500 is cut with a cutting device 401 and then the adjacent sheet strips from among the sheet strips 505a to 505f are conveyed with a separation in the vertical direction. As a result, each of the gaps between the plurality of cut sheet strips 505a to 505f can be provided easily. For example, as shown in FIG. 14, after the original sheet 500 has been cut by the cutting device 401, the sheet strips 505a, 505c, 505e with odd numbers, as counted from the end, may be conveyed upward and the sheet strips 505b, 505d, 505f with the odd numbers may be conveyed downward. As a result, even when the number of the sheet strips 505a to 505f obtained by cutting is large, the edges of the sheet strips 505a to 505f that are adjacent after cutting can be reliably prevented from rubbing against each other. Further, the installation space of the conveying path can be reduced in size in the planar view thereof.

The plurality of cut sheet strips 505a to 505f can be conveyed for example to a cleaner or an inspection device. In this case, for example as in the case of the apparatus 400A shown in FIG. 14, cleaners 410a, 410b, inspection devices 420a, 420b, and winding devices 430a, 430b may be installed in the upper and lower conveying paths, respectively. In this case, the sheet strips 505a, 505c, 505e that are conveyed along the upper conveying path and the sheet strips 505b, 505d, 505f that are conveyed along the lower conveying path pass through respective separate cleaners 410a, 410b and respective separate inspection devices 420a, 420b. Then, the sheets are wound by respective separate winding devices 430a, 430b.

However, in this case, as shown in FIG. 14, the cleaners 410a, 410b, inspection devices 420a, 420b, and winding devices 430a, 430b are necessary for the upper conveying path and lower conveying path, respectively. Further, the conveying paths that are separated in the vertical direction for the sheet strips 505a to 505f are long and complex. In addition, the number of guide rollers 402 is increased and the equipment cost as a whole can easily become high. Moreover, a predetermined space is required to set the conveying paths for conveying the electrode sheets 505a to 505f and install the cleaners 410a, 410b and inspection pieces 420a, 420b.

<<Apparatus 400B>>

Figure 15:
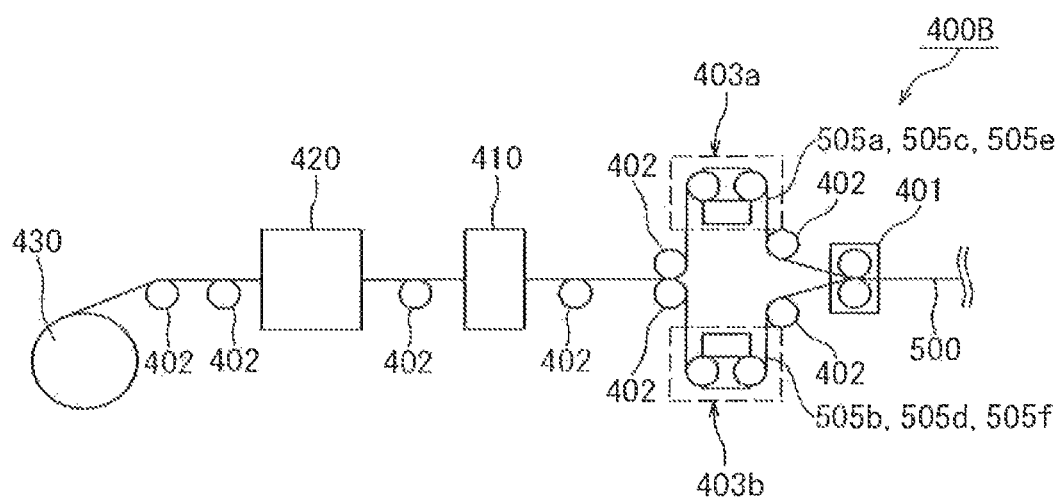
FIG. 15 illustrates the configuration of the electrode sheet manufacturing apparatus of the embodiment of the present invention.

By contrast in the configuration of the apparatus 400B shown in FIG. 15, the equipment cost and space are reduced. As shown in FIG. 15, the apparatus 400B is provided with a mechanism A (step A) and a mechanism B (step B).

In the mechanism A (step A), an original sheet 500 is cut into a plurality of sheet strips 505a to 505f, the adjacent sheet strips are guided separately to an upper conveying path and a lower conveying path, and the respective positions of the sheet strips 505a to 505f are adjusted in the upper and lower conveying paths. Thus, in the mechanism A, the apparatus 400 first cuts the original sheet 500 into a plurality of sheet strips 505a to 505f along the cutting lines z1 to z5 (see FIG. 16) and then the adjacent sheet strips 505a, 500c, 505e and sheet strips 505b, 505d, 505f are separated in the vertical direction. Then, the positions (gaps) of the sheet strips 505a to 505f in the upper and lower conveying paths are adjusted.

In the mechanism B (step B), the apparatus 400B arranges the sheet strips 505a to 505f, for which the positions (gaps) have been adjusted in the upper and lower conveying paths, side by side so as to be spaced from each other widthwise, and guides the sheet strips to a single conveying path to convey the sheet strips.

In such an apparatus 400B, the original sheet 500 is cut into a plurality of sheet strips 505a to 505f by a cutting device 401. Then, the adjacent sheet strips from among the cut sheet strips 505a to 505f are separated in the vertical direction and conveyed. In the present embodiment, the sheet strips 505a, 505c, 505e with odd numbers from the right end in the conveying direction, from among the cut sheet strips 505a to 505f, are conveyed upward and the sheet strips 505b, 505d, 505f with even numbers are conveyed downward. As a result, in the sheet strips 505a to 505f having been cut by the cutting device 401, the edges of the adjacent sheet strips 505a to 505f are prevented from rubbing against each other.

Figure 16:
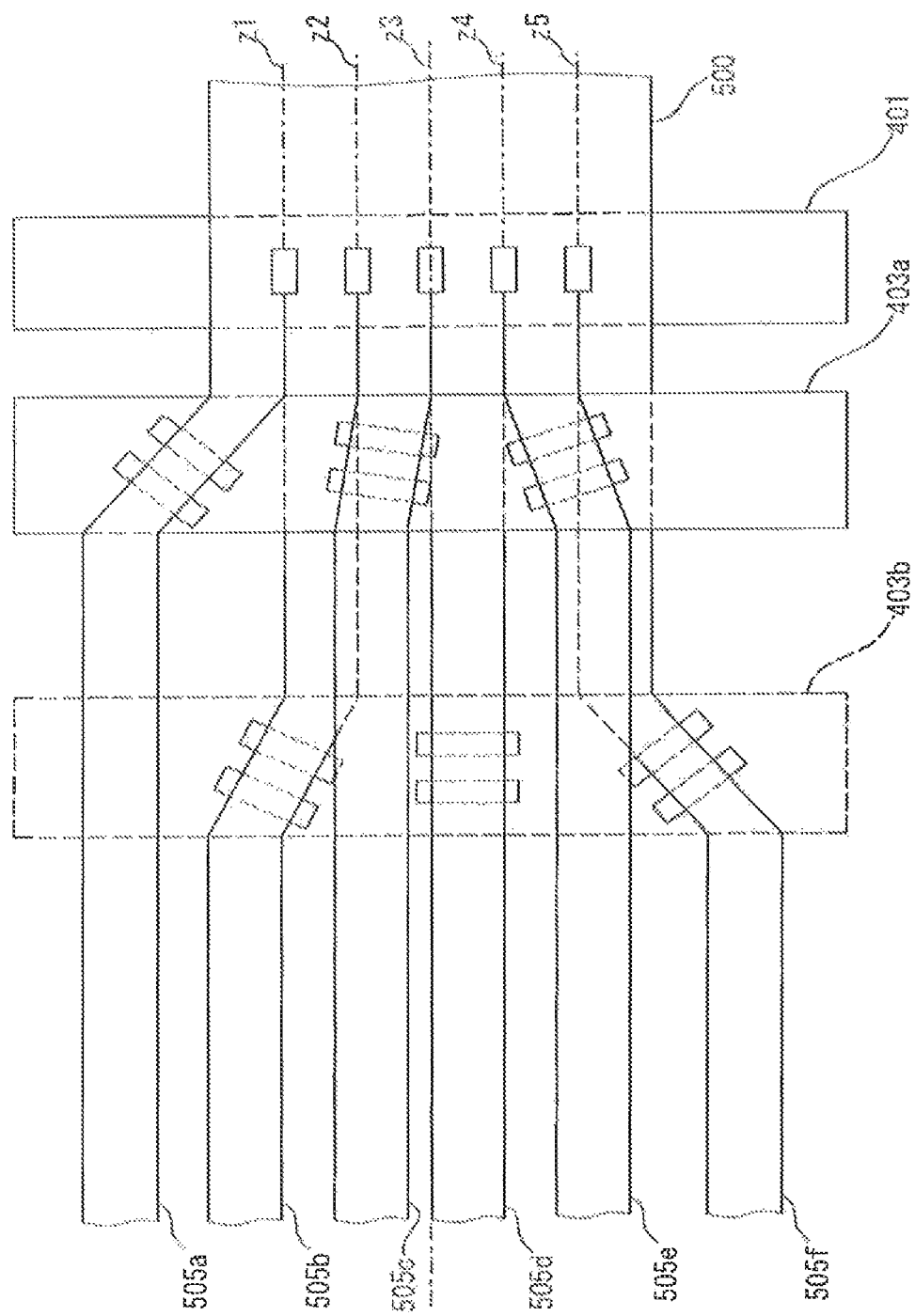
FIG. 16 is a plan view illustrating a guide roll structure of the electrode sheet manufacturing apparatus of the embodiment of the present invention.

Further, in the present embodiment, as shown in FIG. 16, the conveying path of the sheet 505d from among the electrode sheets 505a to 505f having been divided (cut) by the cutting device 401 and the conveying path of the original sheet 500 before the cutting are set along the same straight line z3 (in the present embodiment, the central line in the widthwise direction of the original sheet 500 before the cutting). As a result, a tension acts adequately between the electrode sheets 505a to 505f obtained by cutting performed by the cutting device 401 and the original sheet 500 before the cutting, and the original sheet 500 before the cutting can be adequately conveyed.

<<Guide Roll Mechanism 403a, 403b>>

The apparatus 400B shown in FIG. 15 is provided with guide roll mechanisms 403a, 403b that adjust the positions (gaps) of the sheet strips in the upper and lower conveying paths having been separated in the vertical direction.

The guide roll mechanism 403a, 403b may use for example guide roll mechanisms that are used in CPC or EPC. Thus, guide roll mechanisms for EPC that are manufactured by Nireco Corporation (Japan) can be used as the guide roll mechanisms 403a, 403b. As the representative guide roll mechanisms for EPC, there are a guide roll mechanism of a center pivot system and a guide roll mechanism of an end pivot system. Appropriate guide roll mechanisms can be appropriately selected and used as the guide roll mechanisms 403a, 403b. By providing the guide roll mechanisms 403a, 403b in the upper and lower conveying paths, it is possible to control the positions (gaps) of the cut electrode sheets 505a to 505f in the upper and lower conveying paths with good accuracy.

In the apparatus 400B, each of the positions (gaps) of the upper sheet strips 505a, 505c, 505e and lower sheet strips 505b, 505d, 505f are adjusted by the above-described guide roll mechanisms 403a, 403b. Then, the sheet strips 505a to 505f are provided with a predetermined gap and conveyed side by side in the widthwise direction in a single conveying path. Thus, as shown in FIG. 16, the positions of the sheet strips 505a, 505c, 505e that are conveyed in the upper conveying path are adjusted by the guide roll mechanism 403a installed for the upper conveying path. Each of the positions of the sheet strips 505b, 505d, 505f that are conveyed in the lower conveying path is adjusted by the guide roll mechanism 403b installed for the lower conveying path. For the sake of convenience of illustration, the installation positions of the guide roll mechanisms 403a, 403b in FIG. 16 are displaced.

The sheet strips 505a to 505f are conveyed side by side in the widthwise direction in a single conveying path so as to prevent the edges of the sheet strips 505a to 505f from rubbing against each other. For this purpose, the guide roll mechanisms 403a, 403b are provided in the upper and lower conveying paths respectively for the conveying paths of the sheet strips 505a to 505f. As a result, when the sheet strips 505a to 505f are conveyed in the single conveying path, the required gap can be generated between the sheet strips 505a to 505f so that the edges of the sheet strips 505a to 505f are prevented from rubbing against each other.

Further, in the present embodiment, the sheet strips 505a, 505c, 505e with odd numbers from the right end in the conveying direction, from among the cut sheet strips 505a to 505f, are conveyed upward, and the sheet strips 505b, 505d, 505f with even numbers are conveyed downward. Each of the positions (gaps) of the sheet strips 505a, 505c, 505e with odd numbers is adequately adjusted by the upper guide roller mechanism 403a. Each of the positions (gaps) of the sheet strips 505b, 505d, 505f with even numbers is adequately adjusted by the lower guide roll mechanism 403b. After the required gap has been generated between each of the sheet strips 505a to 505f, each of the sheet strips 505a to 505f is arranged in the order of 505a to 505f in the widthwise direction and guided toward the single conveying path.

With the apparatus 400B, as shown in FIG. 15, each of the positions (gaps) of the cut electrode sheets 505a to 505f can be adjusted with high accuracy in the upper and lower conveying path by the respective guide roll mechanisms 403a, 403b. Further, as shown in FIG. 16, a required gap can be generated between each of the sheet strips 505a to 505f so that the edges of the sheet strips 505a to 505f are prevented from rubbing against each other, and each of the sheet strips 505a to 505f can be conveyed to the single conveying path. Thus, in the apparatus 400B, a predetermined gap can be generated between each of the plurality of cut sheet strips 505a to 505f, and each of the sheet strips 505a to 505f can be arranged side by side in the widthwise direction and conveyed in the single conveying path. Therefore, the plurality of cut sheet strips 505a to 505f can pass through a single cleaner 410 and a single inspection device 420. In addition, the plurality of sheet strips 505a to 505f can be wound by a single winding device 430.

In this case, the cleaner 410 may be for example a device that can remove foreign matter that has adhered to the sheet strips 505a to 505f, while the plurality of sheet strips 505a to 505f having been arranged side by side so as to be spaced from each other widthwise are conveyed. Further, the inspection device 420 may be a device that conducts inspection, while the plurality of sheet strips 505a to 505f having been arranged side by side so as to be spaced from each other widthwise are conveyed. For example, a device that inspects a width or thickness of the electrode material coated on the sheet strips 505a to 505f and the coating positions on the sheet strips 505a to 505f can be used as the inspection device 420.

<<Winding Device 430>>

Figure 17:
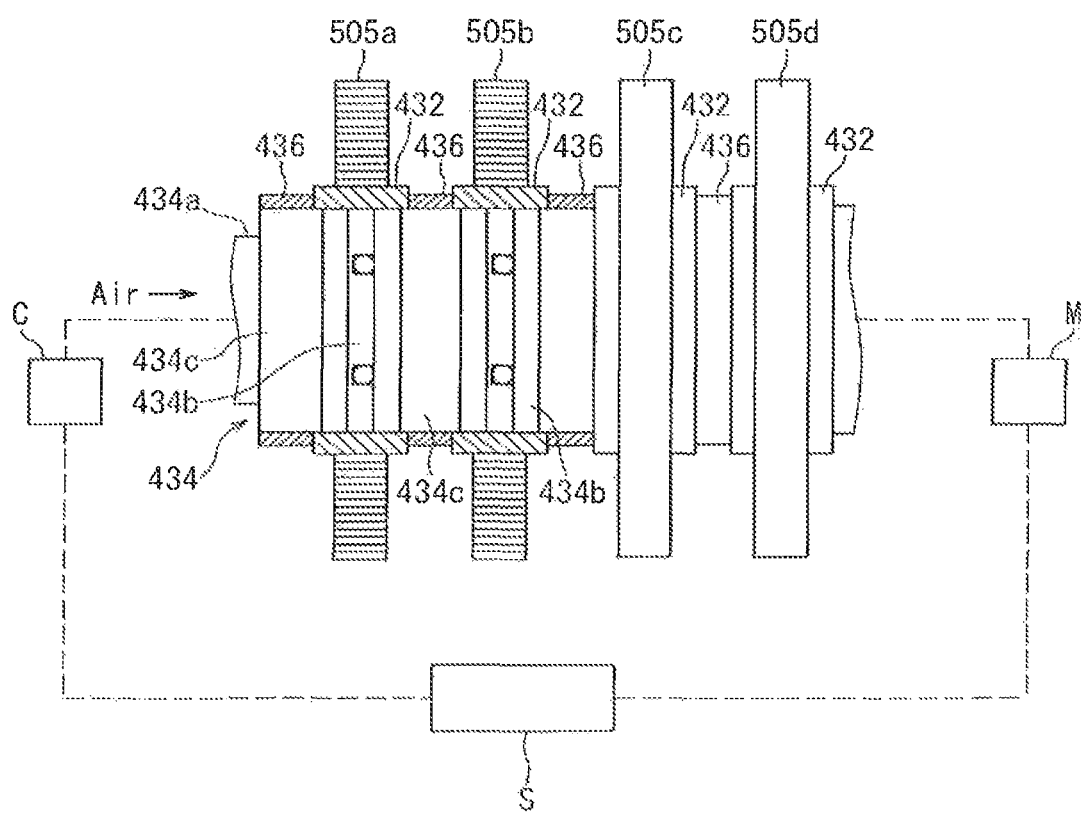
FIG. 17 is a partial cross-section illustrating a winding device of the electrode sheet manufacturing apparatus of the embodiment of the present invention.

In the winding device 430, as shown in FIG. 17, a plurality of winding reels 432 are mounted on a friction shaft 434. The friction shaft 434 is a shaft that enables the adjustment of torque acting on the winding reels 432. A variety of commercial friction shafts can be used as the "friction shaft 434". For example, an air friction shaft manufactured by Kabushiki Kaisha Seiwa (Japan) can be used as the commercial friction shaft. In the air friction shaft, the torque acting upon the winding reels 432 can be adjusted by the action of air (compressed air).

The friction shaft 434 of the present embodiment is provided with a shaft portion 434a, torque-imparting rings 434b, and gap-maintaining rings 434c. The shaft portion 434a is a hollow rod-like member. The torque-imparting rings 434b and gap-maintaining rings 434c are alternately mounted on the outer circumferential surface of the shaft portion. A plurality of the winding reels 432 are mounted on the outer circumference of the friction shaft 434. Spacers 436 are inserted between the winding reels 432. The positions of the winding reels 432 are set with respect to the outer circumference of the friction shaft 434.

The winding reels 432 are disposed with a gap in the lengthwise direction correspondingly to the positions of the sheet strips 505a to 505f conveyed toward the winding device 430. Torque-imparting rings 434b are disposed on the inner circumferential side of the winding reels 432. In the shaft portion 434a of the friction shaft 434, the compressed air is supplied from the compressor C into the hollow portion.

The torque-imparting rings 434b generate a friction force with the winding reels 432 correspondingly to the air pressure in the hollow section of the shaft portion 434a. A required torque is caused to act upon the winding reels 432. In this case, where the air pressure increases in the hollow section of the shaft portion 434a, the friction force between the torque-imparting rings 434b and winding reels 432 increases. Further, where the air pressure decreases in the hollow section of the shaft portion 434a, the friction force between the torque-imparting rings 434b and winding reels 432 also decreases. The gap-maintaining rings 434c are ring members for maintaining the gap of the torque-imparting rings 434b. Further, the shaft portion 434a of the friction shaft 434 is connected to a motor M for rotating the friction shaft 434. The drive power of the motor M and the air pressure of the compressed air supplied from a compressor C are controlled by a control device S.

As described above, the friction shaft 434 is controlled by the air pressure of the compressor C and so adjusted as to generate a required torque that is necessary for the winding reels 432 to wind up the sheet strips 505a to 505f. Thus, in a case where the tension acting upon the sheet strips 505a to 505f is low, the sheet strips 505a to 505f are wound up by the winding reels 432 following the rotation of the friction shaft 434. Where the tension acting upon the sheet strips 505a to 505f rises to a predetermined value or above it, a slip occurs between the torque-imparting rings 434b of the friction shaft 434 and the winding reels 432. As a result, the tension acting upon the sheet strips 505a to 505f can be prevented from increasing abruptly.

Thus, in the winding device 430, a plurality of winding reels 432 are disposed with a gap correspondingly to the plurality of sheet strips 505a to 505f on the friction shaft 434. In the friction shaft 434, the torque acting upon the winding reels 432 can be adjusted. Therefore, by the winding device 430 the sheet strips 505a to 505f can be wound up so that the tension acting upon the sheet strips 505a to 505f is prevented from increasing excessively.

Thus, in the apparatus 400B shown in FIG. 15, after the original sheet 500 has been cut into a plurality of sheet strips 505a to 505f, the adjacent sheet strips 505a, 505c, 505e and sheet strips 505b, 505d, 505f are separated in the vertical direction. The positions (gaps) of the sheet strips 505a to 505f are then adjusted in the upper and lower conveying paths. Then, the sheet strips 505a to 505f with positions (gaps) adjusted in the upper and lower conveying paths can be arranged side by side so as to be spaced from each other widthwise and conveyed in a single conveying path. Because the plurality of cut sheet strips 505a to 505f can be conveyed in a single conveying path, they can pass through a single cleaner 410 and a single inspection device 420. Further, the sheet strips 505a to 505f can be wound up with the above-described signal winding device 430. Thus, because only one cleaner, inspection device, and winding device can be used, the equipment cost and space can be reduced.

<<Guide Roller 402>>

When the plurality of sheet strips 505a to 505f are conveyed in a single conveying path, as described hereinabove, the tension acting upon the sheet strips 505a to 505f sometimes differ therebetween. When the tension acting upon the sheet strips 505a to 505f differs therebetween, a difference in tightening or loosening degree occurs between the sheet strips 505a to 505f in the conveying path. Where a difference in tightening or loosening degree between the sheet strips 505a to 505f increases, it can cause wrinkles or a large difference in hardness and length between the sheet strips 505a to 505f wound up by the winding reels 432.

Accordingly, it may be used as the guide rollers 402 in the case of conveying the plurality of sheet strips 505a to 505f that guide rollers can convey the plurality of sheet strips 505a to 505f correspondingly to the difference in tension acting upon the sheet strips 505a-to 505f.

Figure 18:
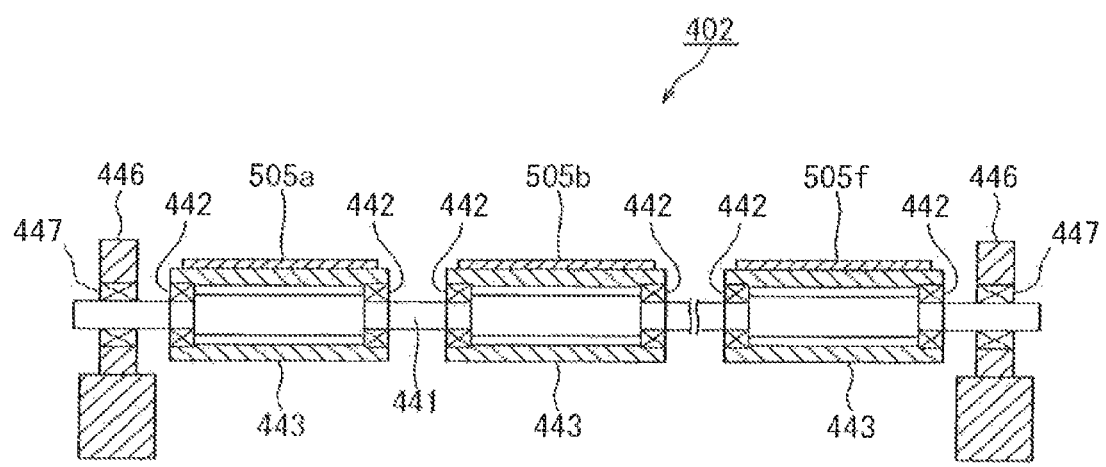
FIG. 18 is a cross-sectional view illustrating a guide roller of the electrode sheet manufacturing apparatus of the embodiment of the present invention.

For example, as shown in FIG. 18, the guide roller 402 is provided with a rotary shaft 441, tendency drive roller bearings 442 (bearings for tendency drive roller), and shells 443.

The rotary shaft 441 is rotatably supported by bearings. In the present embodiment, the rotary shaft is rotatably mounted by using bearings 447 on a frame 446 that supports the guide roller 402. A plurality of tendency drive roller bearings 442 are mounted with a predetermined gap on the other circumferential surface of the rotary shaft 441. The tendency drive roller bearings 442 have a slip resistance higher than that of the bearings 447 supporting the rotary shaft 441. The shells 443 are members that guide the sheet strips 505a to 505f. The shells 443 are mounted on the outer rings of the tendency drive roller bearings 442.

Each shell 443 of the guider roller 402 is mounted on the rotary shaft 441 by the tendency drive roller bearing 442. In this case, the tendency drive roller bearing 442 absorbs by relative rotation of the rotary shaft 441 and shell 443 the tension acting upon the conveyed sheet strip 505a. Thus, each shell 443 is constituted by the so-called tendency drive roller.

Thus, the guide roller 402 conveys the sheet strips 505a to 505f having been arranged side by side so as to be spaced from each other widthwise by the plurality of shells 443 constituting the respective tendency drive rollers. In other words, in the guider roller 402, the shells 443 are rotated by the rotation of the rotary shaft 441 supported by the bearings 447. Further, the shells 443 are rotated appropriately relative to the rotary shaft 441 by the tendency drive roller bearings 442 correspondingly to the difference in tension acting upon the sheet strips 505a to 505f. As a result, a required difference is generated in the rotation speed of the shells 443 conveying the sheet strips 505a to 505f. Thus, the sheet strips 505a to 505f can be conveyed by the plurality of shells 443 mounted on a single rotary shaft 441, while allowing for a difference in tension acting upon the sheet strips 505a to 505f. Thus, the guide roller 402 can guide the sheet strips 505a to 505f having been arranged side by side so as to be spaced from each other widthwise, while allowing for a difference in tension.

As described hereinabove, the apparatus 400B, as shown in FIG. 15, cuts the original sheet 500 into a plurality of sheet strips 505a to 505f, guides the adjacent sheet separately to an upper conveying path and a lower conveying path, and adjusts respective position of the sheet strips in the upper and lower conveying paths. Then, the apparatus 400B arranges the sheet strips 505a to 505f the positions of which have been adjusted in the upper and lower conveying paths are arranged side by side so as to be spaced from each other widthwise, and guides the sheet strips 505a to 505f to a single conveying path to convey. This apparatus 400B can be adequately applied to the apparatus 100 for manufacturing electrode sheets that is shown in FIG. 2.

For example, as shown in FIG. 3 and FIG. 8, the original sheet 1 is cut by the first cutting device 104 and then divided (cut) into electrode sheets 5a to 5f by the second cutting device 114. In the example shown in FIG. 3, the original sheet 1 has a total of three coated portions 11, 12, 13 coated with the electrode material in the widthwise direction. The original sheet 1 is cut by the first cutting device 104 into three sheet strips 1a, 1b, 1c. However, the original sheet 1 may have more than three coated portions coated with the electrode material in the widthwise direction. Thus the productivity rises as the number of electrode sheets obtained from one original sheet 1 increases.

The above-described apparatus 400B (see FIG. 15) is advantageous for increasing the number of electrode sheets obtained from the original sheet 1. Thus, for example, when six coated portions are formed in the original sheet 1 (this configuration is not shown in the figure), the original sheet 1 is cut into six sheet strips by the first cutting device 104. In this case, as shown in FIG. 15, first, the apparatus guides adjacent sheet strips separately to an upper conveying path and a lower conveying path, and adjusting respective position (gap) of the sheet strips in the upper and lower conveying paths. Then, the apparatus arranges the sheet strips the positions (gaps) of which having been adjusted in the upper and lower conveying paths, side by side so as to be spaced from each other widthwise, and guides the sheet strips to a single conveying path to convey. As a result, the plurality of sheet strips can be conveyed so that the edges of the plurality of sheet strips having been cut from the original sheet 1 are prevented from rubbing. Further, because a plurality of sheet strips can be guided by a single conveying path, for example, the space taken by the rolling devices, cleaners, and inspection device can be saved, the number of guide rollers can be reduced, and cost can be reduced. In this case, the number of electrode sheets obtained from a single original sheet is increased, the productivity of electrode sheets is increased, and therefore the productivity of batteries using these electrode sheets is also increased.

The invention claimed is:

1. An electrode sheet manufacturing apparatus, comprising:
    a feed reel configured to be wound with an original sheet comprising a belt-shaped metal foil and a plurality of coated portions coated on the belt-shaped metal foil with an electrode material in a lengthwise direction and formed to have a predetermined width with a predetermined uncoated gap;
    a conveying mechanism configured to convey the original sheet from the feed reel;
    a first cutting device arranged in a conveying path of the conveying mechanism, and having a plurality of slitters configured to cut the original sheet into original sheet strips in the lengthwise direction along cutting lines set on the uncoated gaps;
    a rolling device arranged downstream of the first cutting device in a conveying path of the conveying mechanism and configured to press the original sheet strips having been cut by the first cutting device; and
    a second cutting device arranged downstream of the rolling device in the conveying path and having a plurality of slitters configured to cut the original sheet strips in the lengthwise direction along cutting lines set on the coated portions.

2. The electrode sheet manufacturing apparatus according to claim 1, further comprising a position adjusting mechanism configured to adjust a widthwise position of the original sheet supplied to the first cutting device arranged upstream of the first cutting device in the conveying path.

3. The electrode sheet manufacturing apparatus according to claim 1, wherein the rolling device has a pair of rolls, and the rolling device presses the original sheet strips by sandwiching the original sheet strips between the pair of rolls, the original sheet strips having been cut by the first cutting device and arranged side by side so as to be spaced from each other at a gap in an axial direction of the rolls.

4. The electrode sheet manufacturing apparatus according to claim 1, further comprising a gap adjusting device arranged in the conveying path between the first cutting device and the rolling device, and configured to widen the gap between the plurality of original sheet strips having been cut by the first cutting device.

5. The electrode sheet manufacturing apparatus according to claim 1, further comprising a speed adjusting mechanism arranged in the conveying path between the first cutting device and the rolling device and configured to adjust the speed of the plurality of original sheet strips having been cut by the first cutting device, so that the speed of the original sheet strips supplied to the rolling device is adjusted by the speed adjusting mechanism.

6. The electrode sheet manufacturing apparatus according to claim 1, further comprising a distortion correcting device arranged between the rolling device and the second cutting device in the conveying path.

7. The electrode sheet manufacturing apparatus according to claim 6, wherein the distortion correcting device has a correction roller for catching the original sheet strips, and a section of each correction roller that supports uncoated portions of the original sheet strips is thicker than a section thereof that supports the coated portions of the original sheet strips.

8. The electrode sheet manufacturing apparatus according to claim 7, wherein the section of the correction roller that supports the uncoated portions at both widthwise ends of each of the original sheet strips is replaceable.

9. The electrode sheet manufacturing apparatus according to claim 1, further comprising a position adjusting mechanism arranged upstream of the second cutting device in the conveying path and configured to adjust the widthwise positions of the original sheet strips supplied to the second cutting device.

10. The electrode sheet manufacturing apparatus according to claim 1, further comprising:
    a mechanism A configured to guide adjacent sheet strips separately to an upper conveying path and a lower conveying path, and to adjust respective positions of the sheet strips in the upper and lower conveying paths; and
    a mechanism B configured to arrange the sheet strips, the positions of which are adjusted in the upper and lower conveying paths by the mechanism A, side by side so as to be spaced from each other widthwise, and to guide the sheet strips to a single conveying path to convey the sheet strips.

11. The electrode sheet manufacturing apparatus according to claim 10, comprising a guide roller configured to convey the sheet strips arranged side by side and spaced from each other widthwise, the guide roller comprising:
    a rotary shaft rotatably supported by bearings;
    a plurality of tendency drive roller bearings mounted on the rotary shaft so as to be spaced from each other and having a slip resistance larger than that of the bearings; and
    a plurality of shells mounted on the rotary shaft via the tendency drive roller bearings, and
    the guide roller conveying the sheet strips by the plurality of shells.

12. The electrode sheet manufacturing apparatus according to claim 10, further comprising a winding device having a friction shaft and a plurality of winding reels disposed on the friction shaft and spaced lengthwise at a gap corresponding to the gap of the plurality of sheet strips, the friction shaft capable of adjusting a torque acting upon the winding reels,
    the winding device being capable of winding up the plurality of sheet strips by the winding reels disposed on the friction shaft.

13. An apparatus for manufacturing a battery having a wound electrode body including electrode sheets and belt-shaped separators being laminated and wound together, comprising, as an apparatus for manufacturing the electrode sheets, the electrode sheet manufacturing apparatus according to claim 1.

* * * * *